Aug. 7, 1928.  1,680,268
G. WEISS
ABSORBENT PAD MACHINE
Filed March 24, 1920   19 Sheets-Sheet 3

WITNESSES:

INVENTOR
GEORGE WEISS.
ATTORNEY

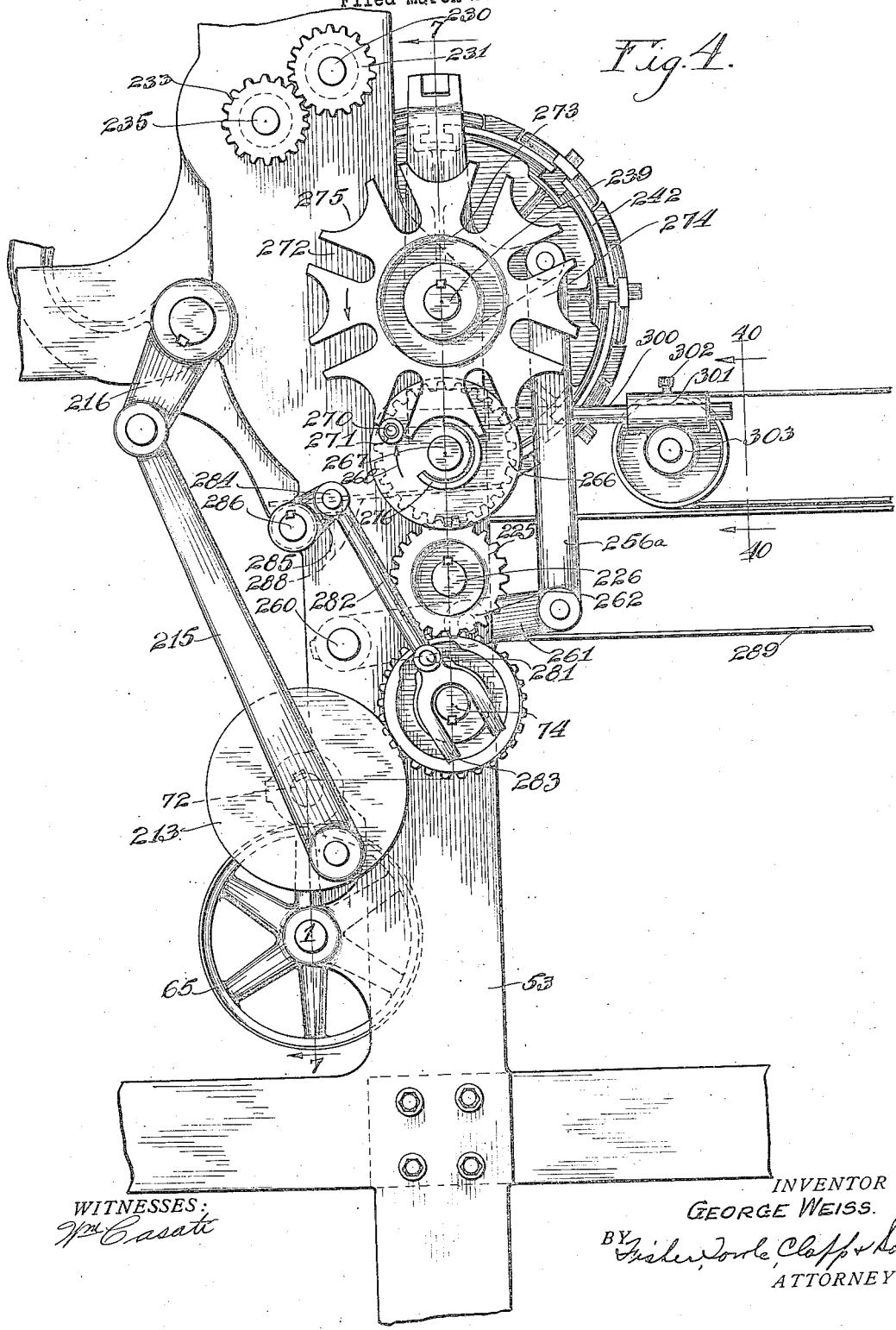

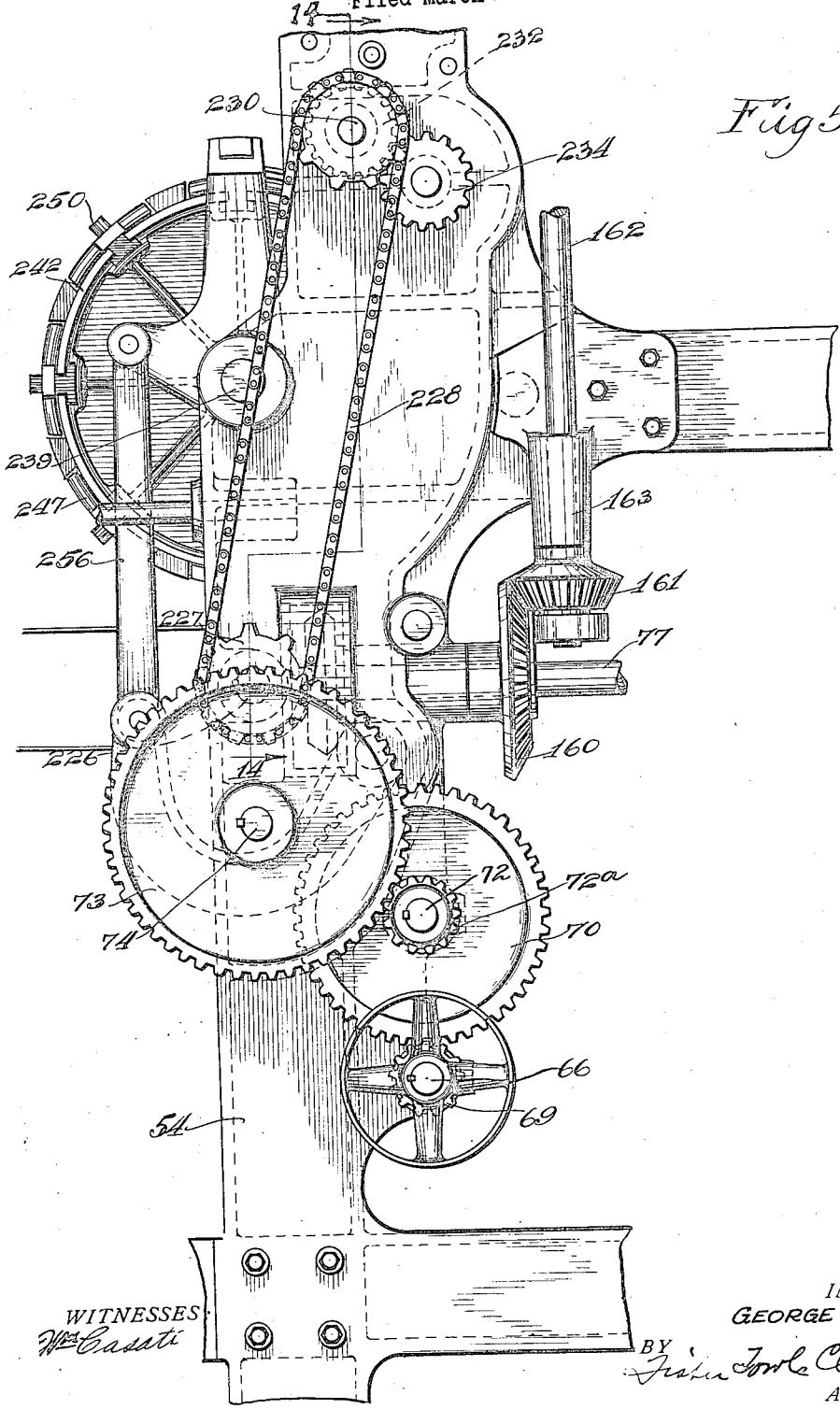

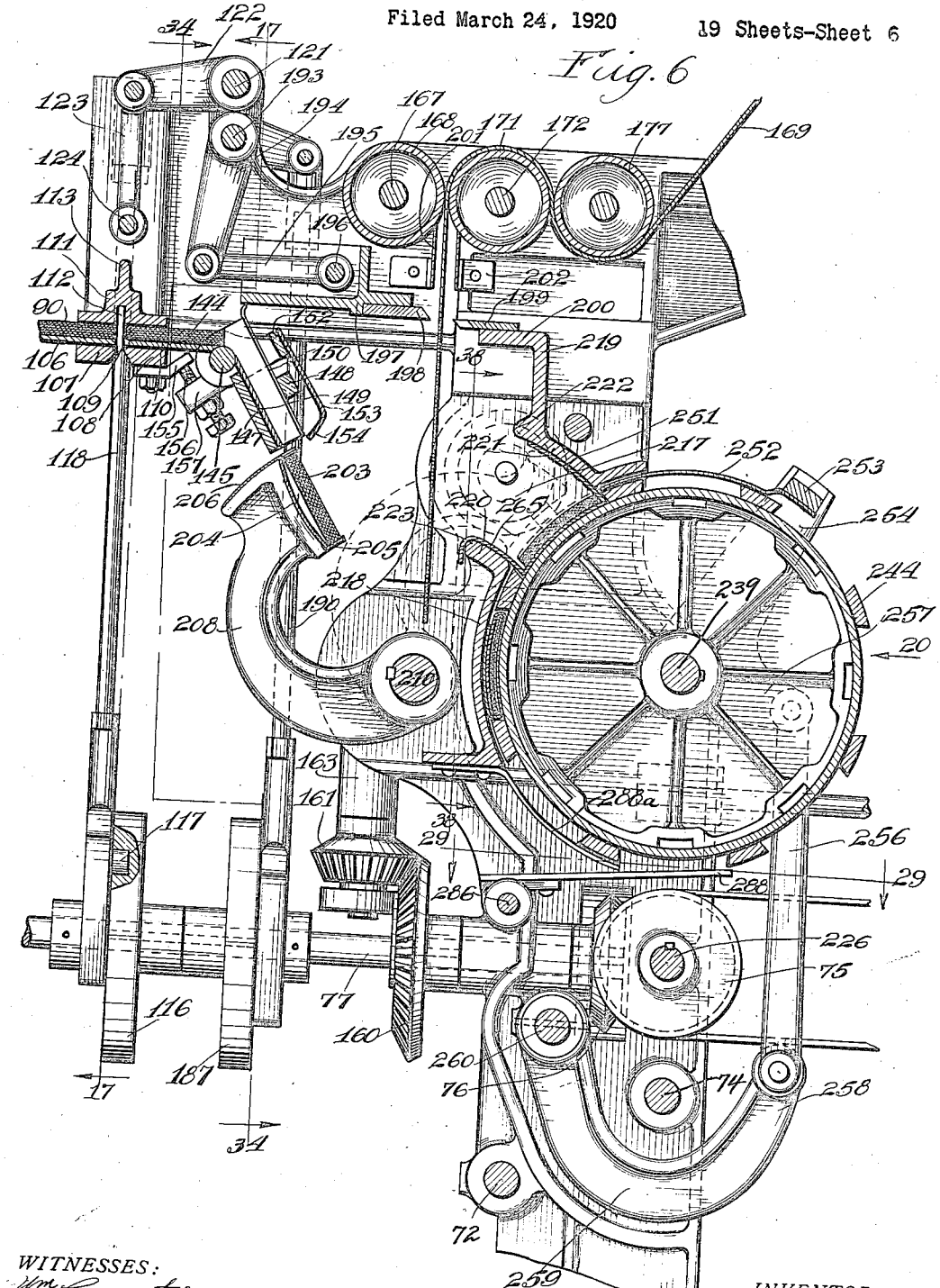

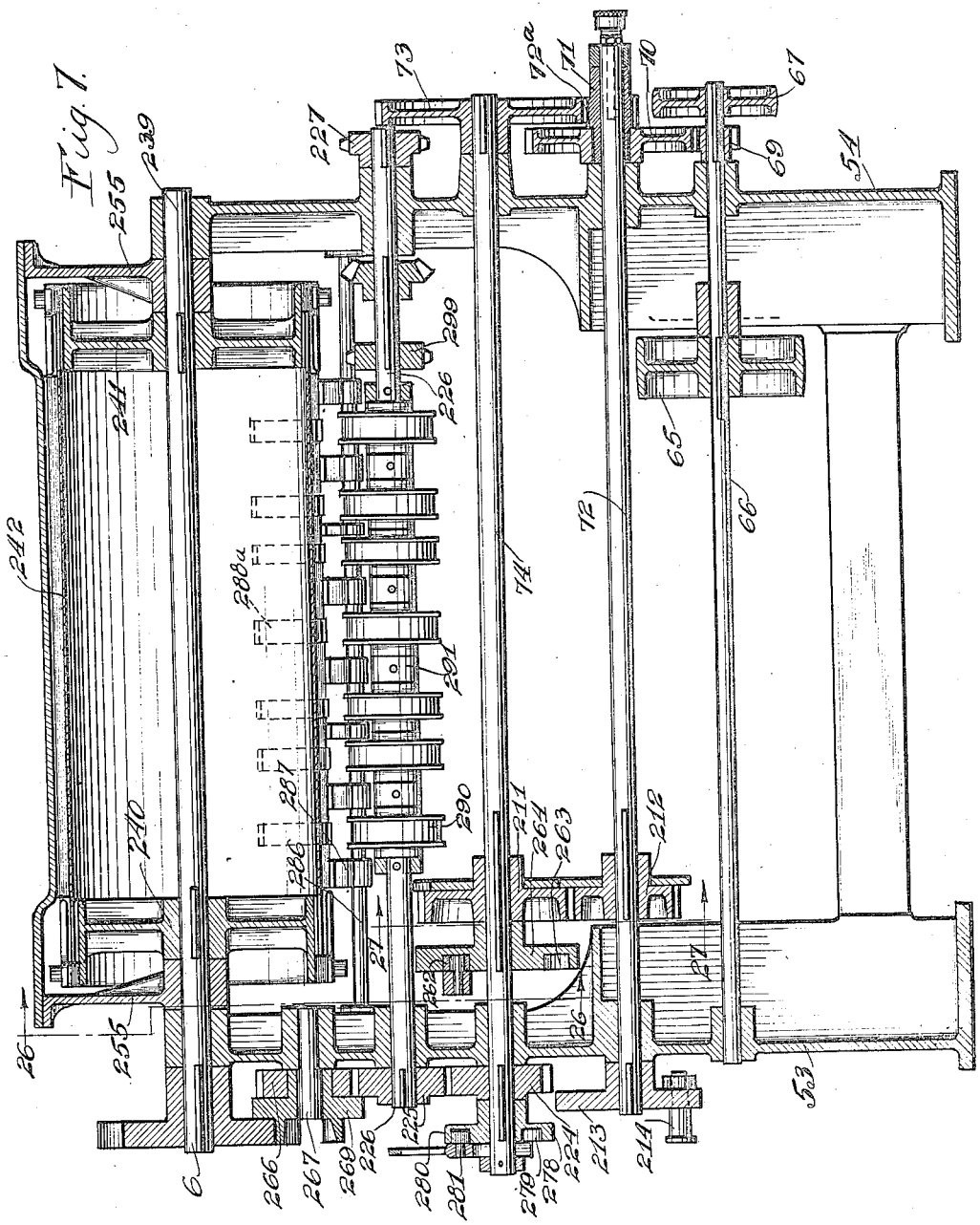

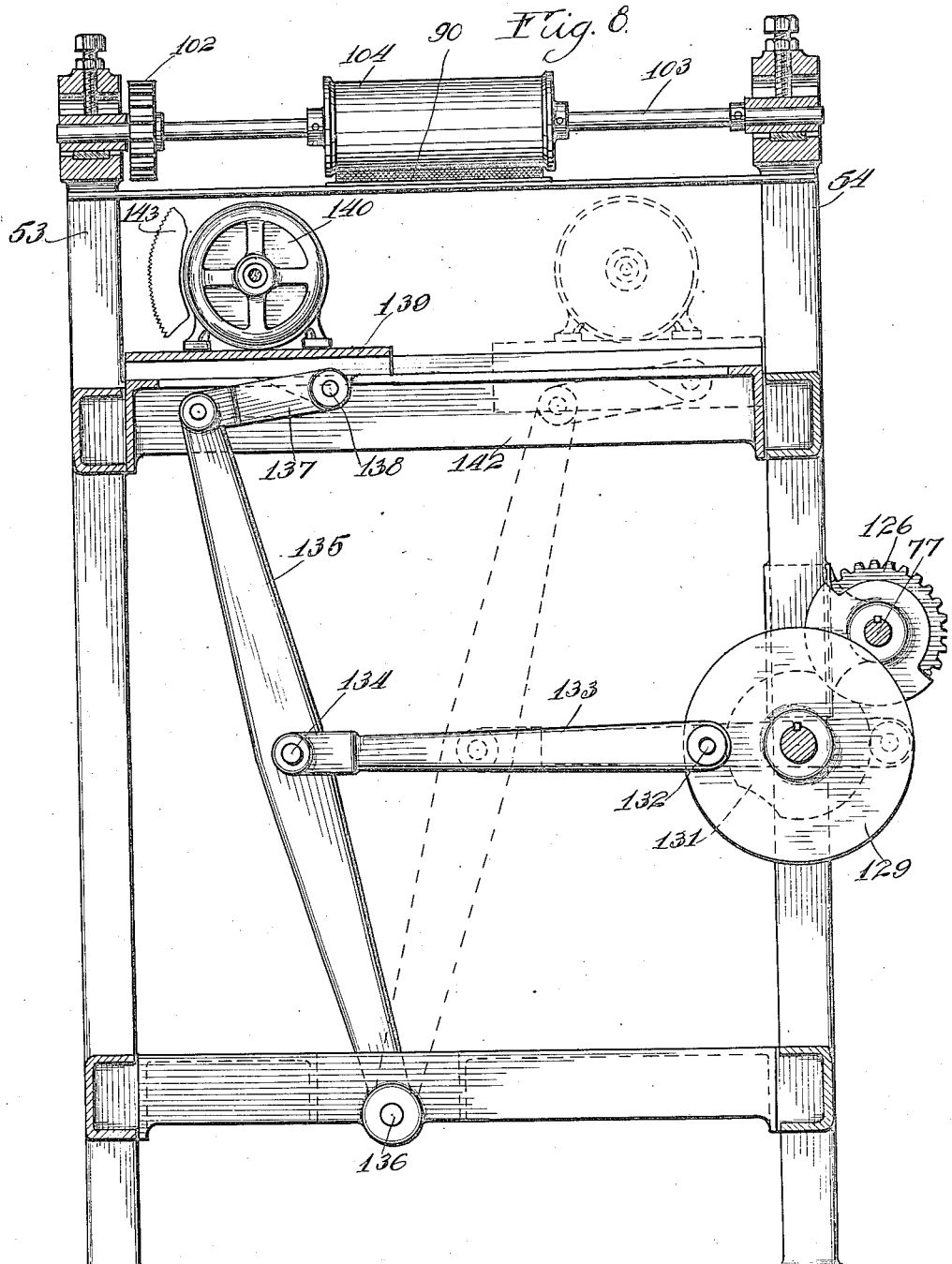

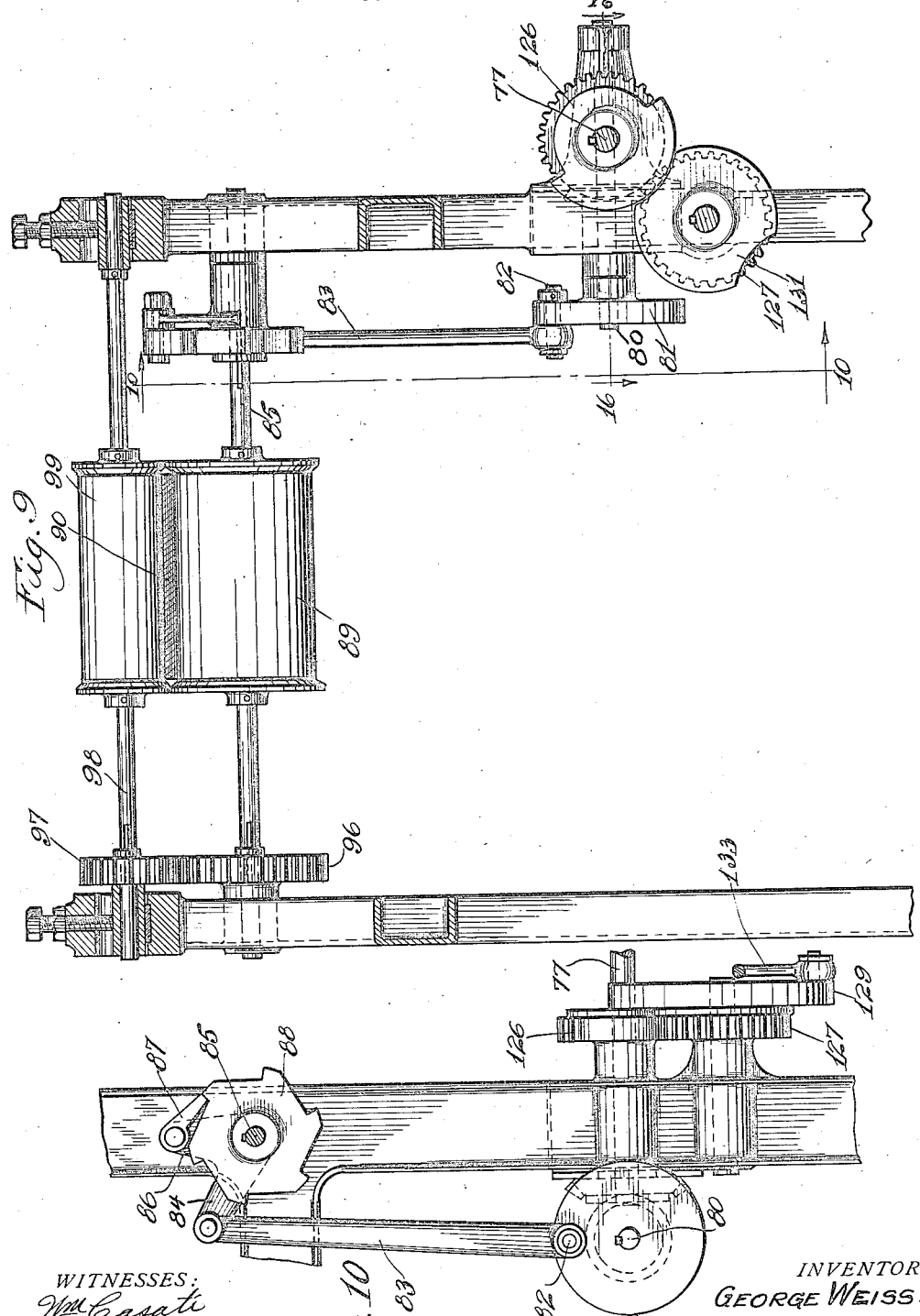

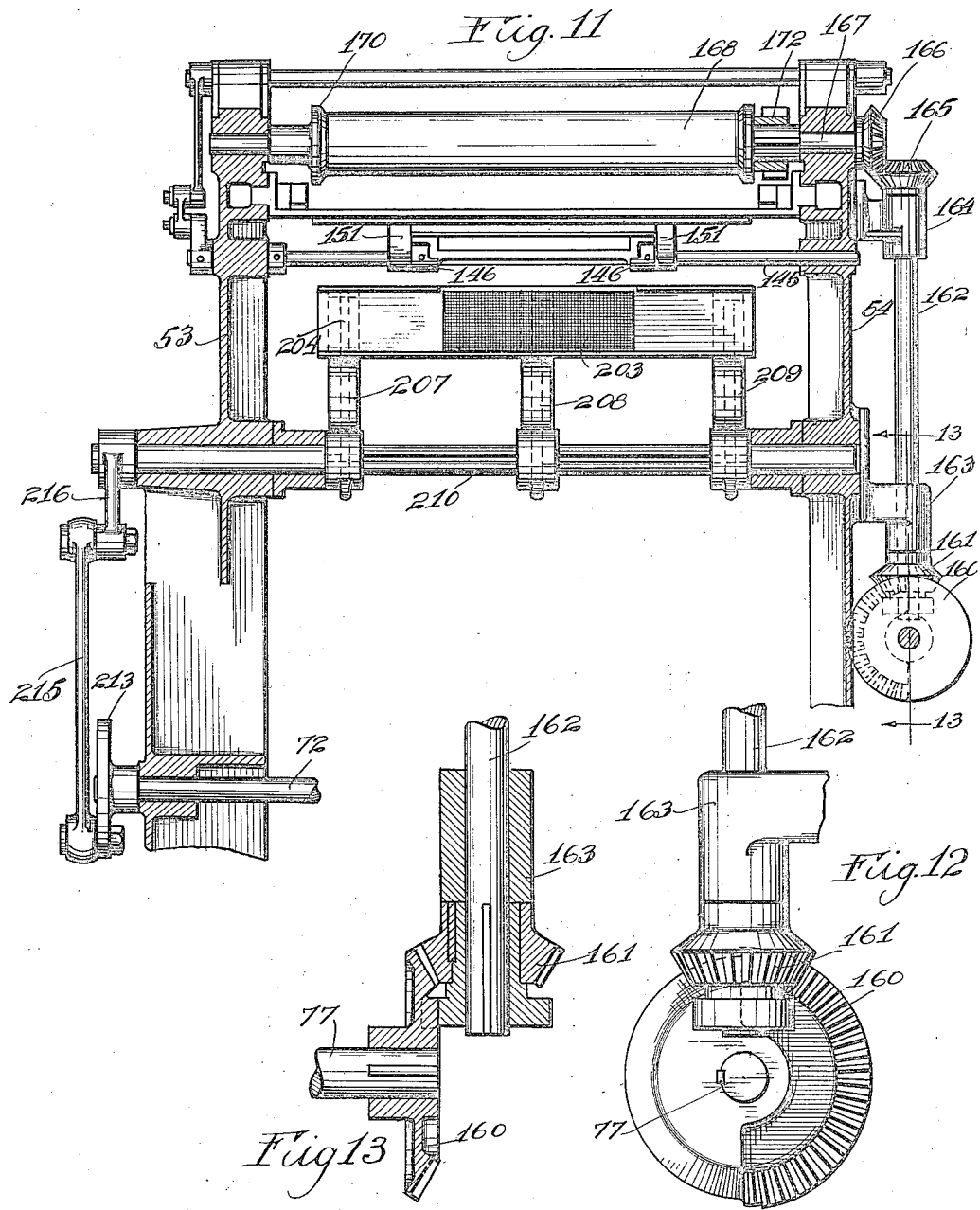

Aug. 7, 1928.  
G. WEISS  
1,680,268  
ABSORBENT PAD MACHINE  
Filed March 24, 1920      19 Sheets-Sheet 11

WITNESSES:

INVENTOR  
GEORGE WEISS.  
BY  
ATTORNEY

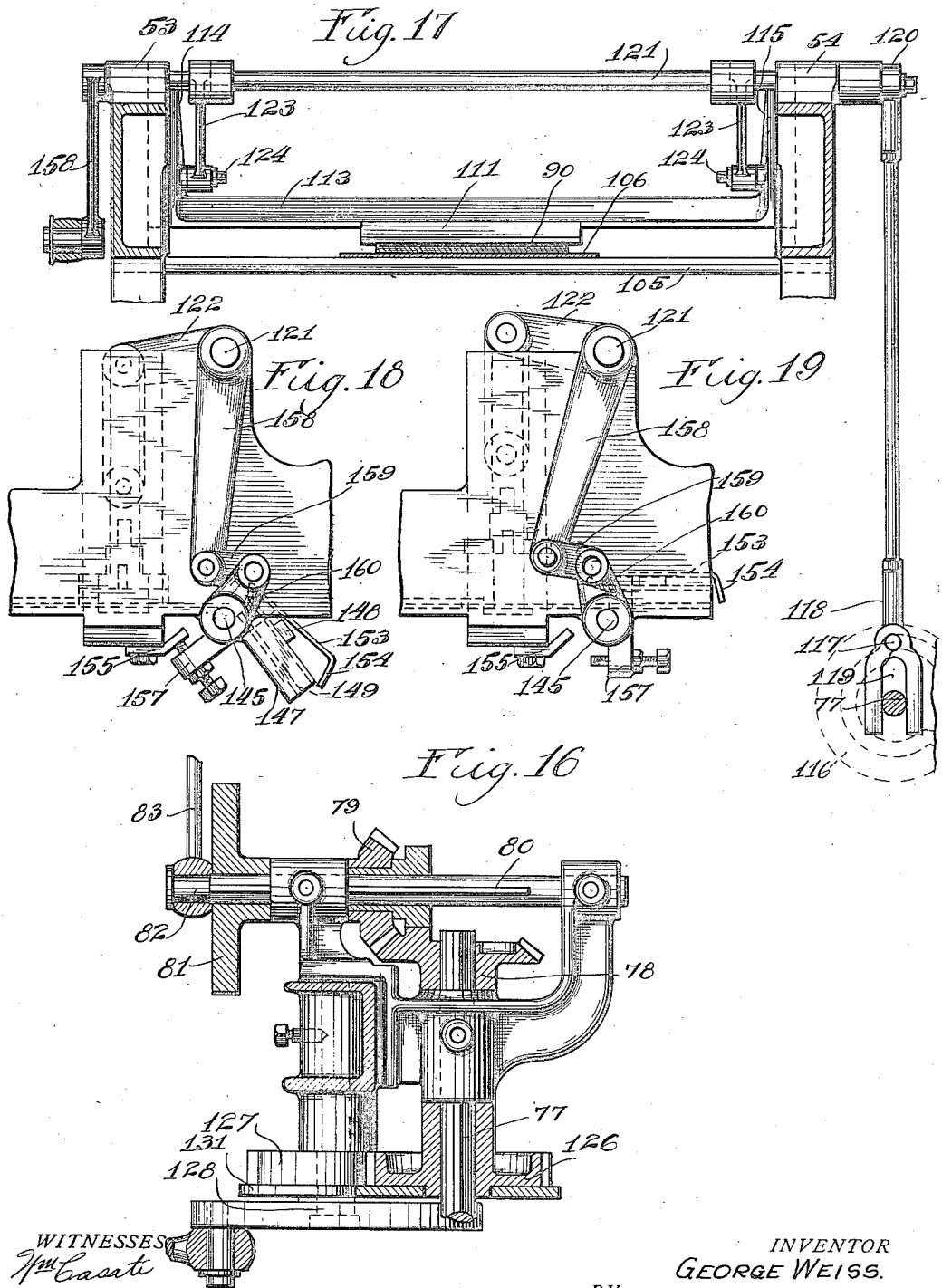

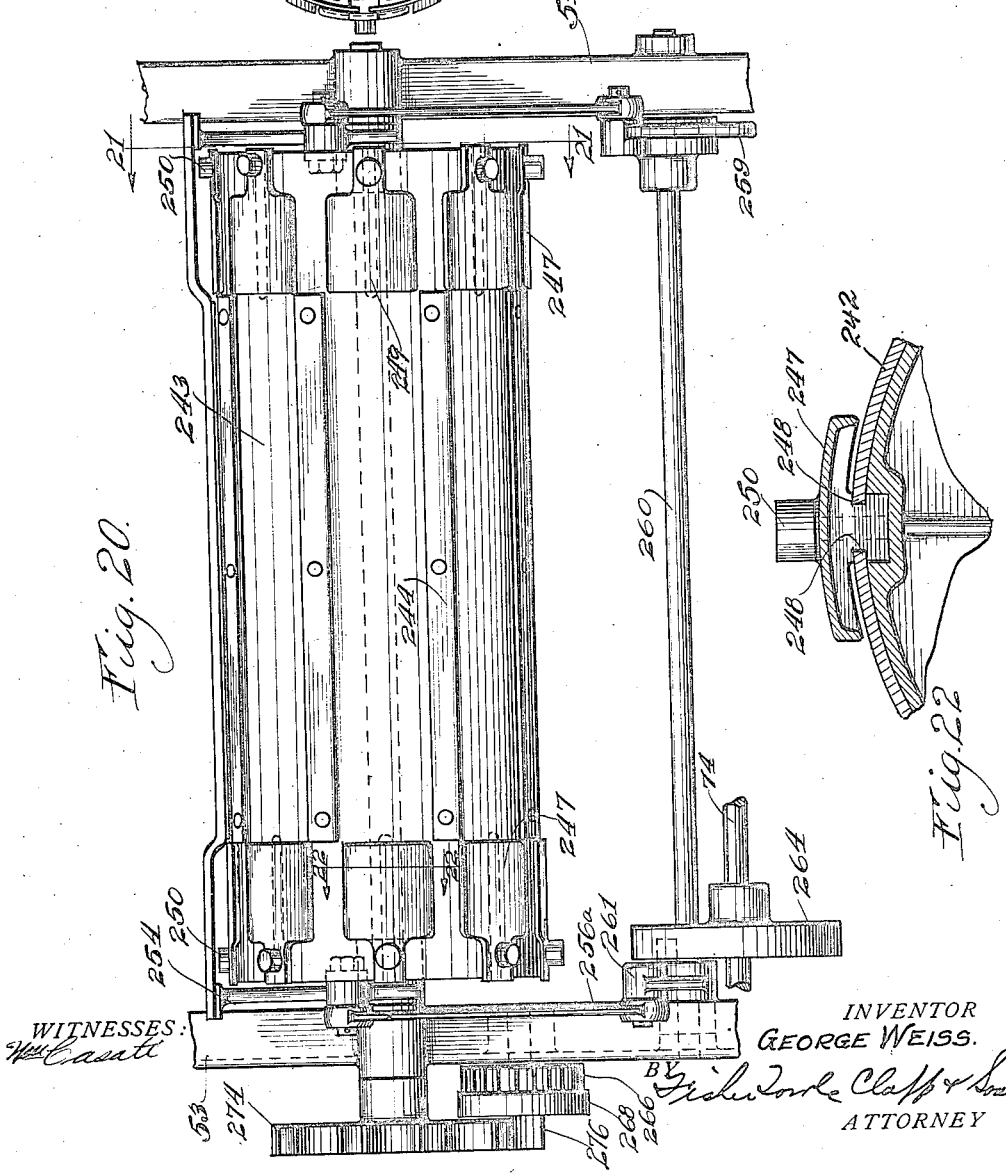

Aug. 7, 1928.  G. WEISS  1,680,268
ABSORBENT PAD MACHINE
Filed March 24, 1920   19 Sheets-Sheet 14
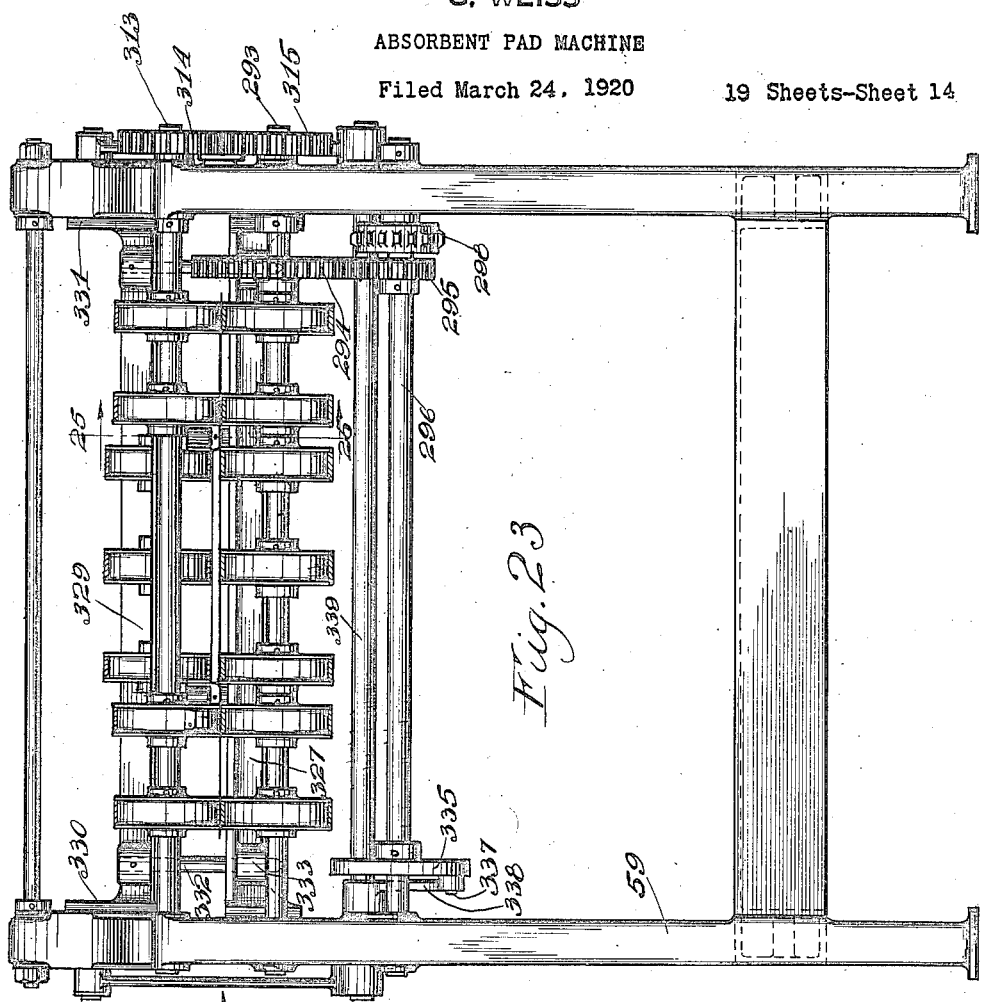
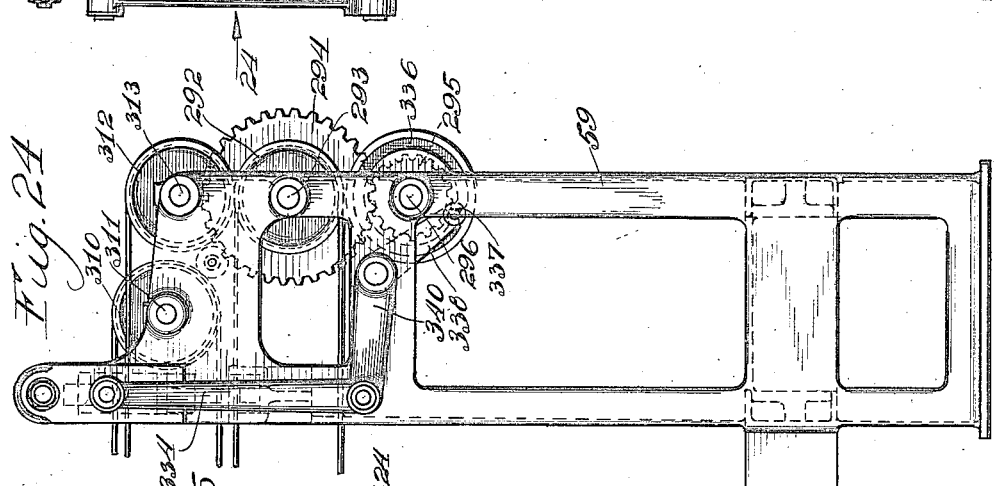
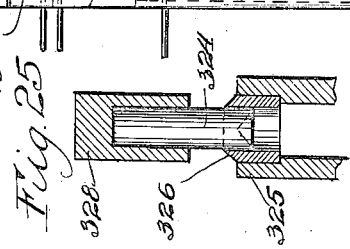
INVENTOR
GEORGE WEISS.

Aug. 7, 1928.
G. WEISS
1,680,268
ABSORBENT PAD MACHINE
Filed March 24, 1920      19 Sheets-Sheet 15
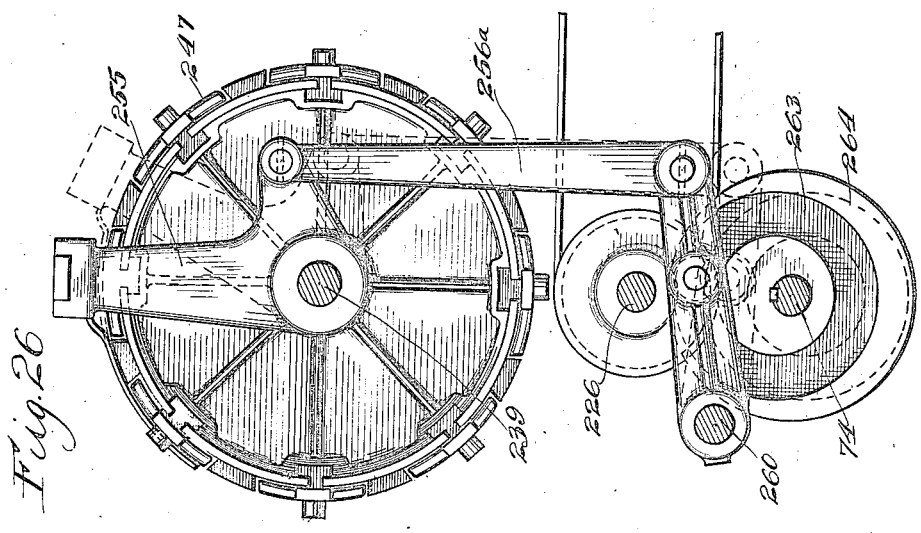
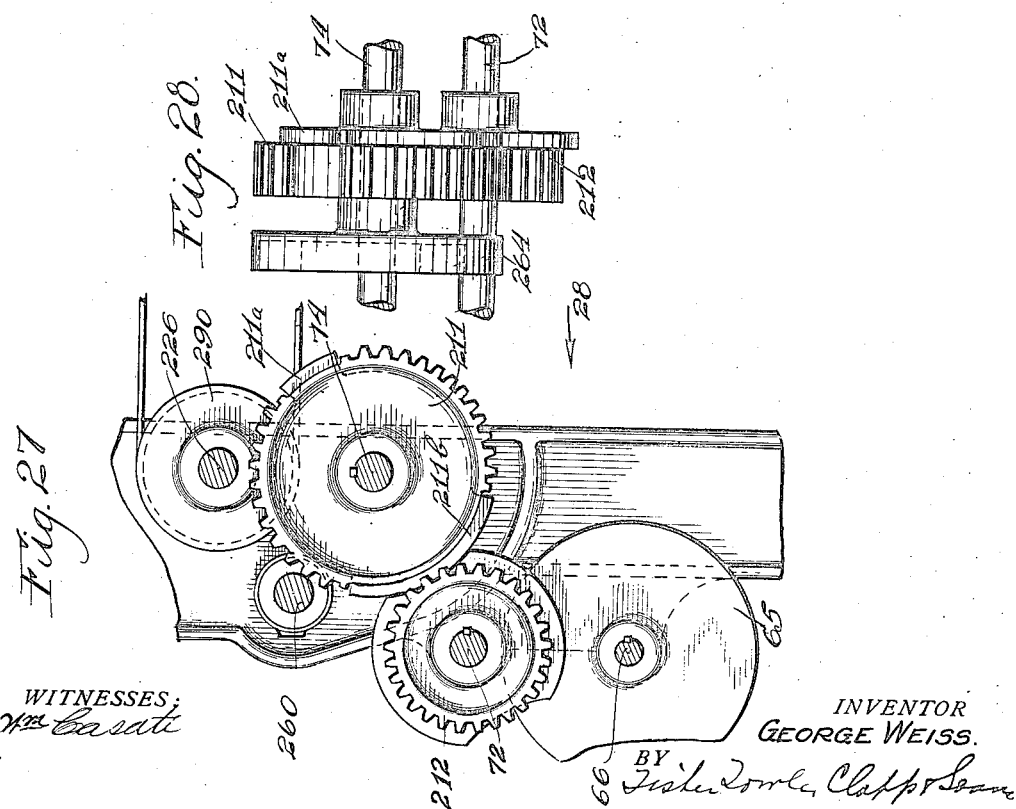
WITNESSES:
INVENTOR
GEORGE WEISS.
BY
ATTORNEY Aug. 7, 1928.  
G. WEISS  
1,680,268  
ABSORBENT PAD MACHINE  
Filed March 24, 1920  
19 Sheets-Sheet 16
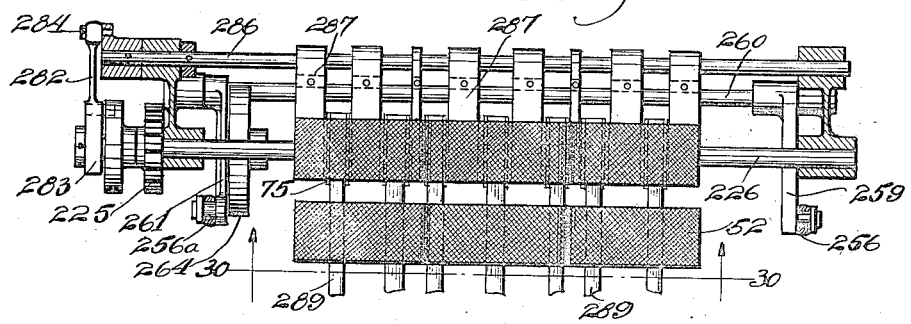
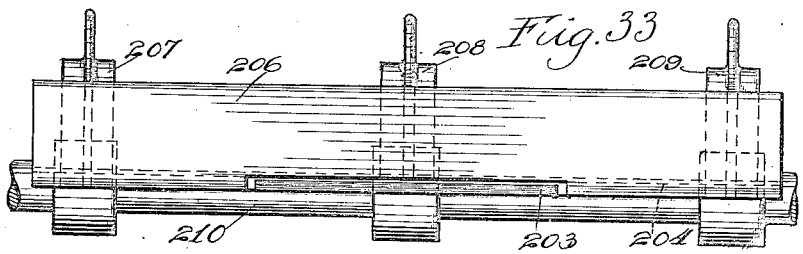
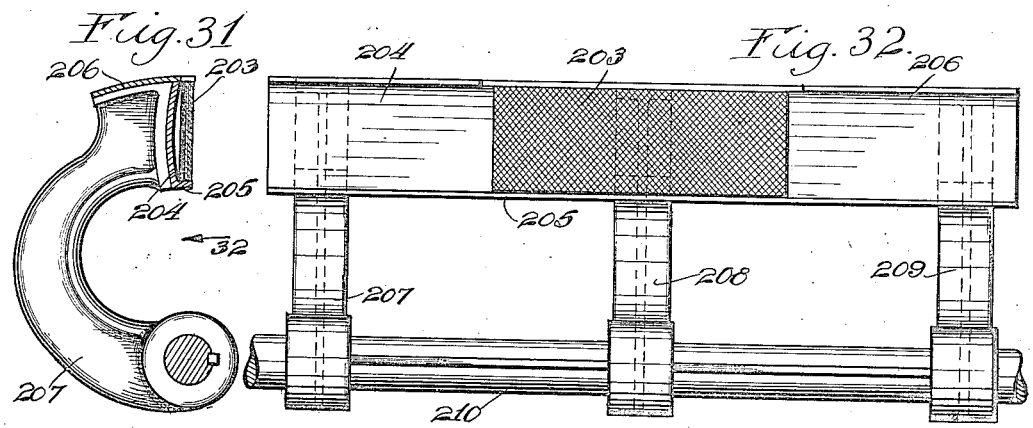
WITNESSES:
INVENTOR  
GEORGE WEISS.  
BY  
ATTORNEY

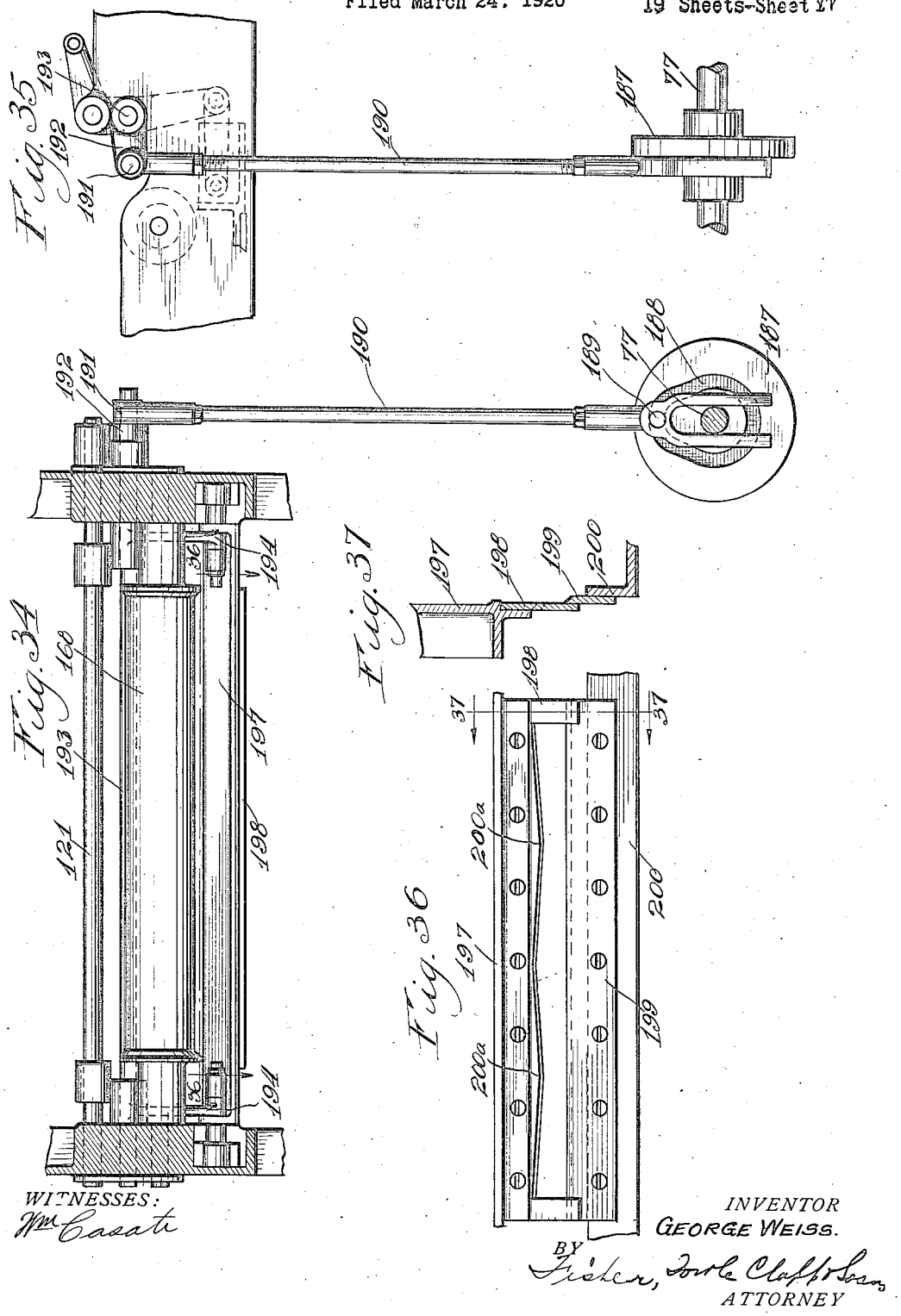

Aug. 7, 1928.

G. WEISS

ABSORBENT PAD MACHINE

Filed March 24, 1920 19 Sheets-Sheet 18

WITNESSES:

INVENTOR
GEORGE WEISS.
BY
ATTORNEY

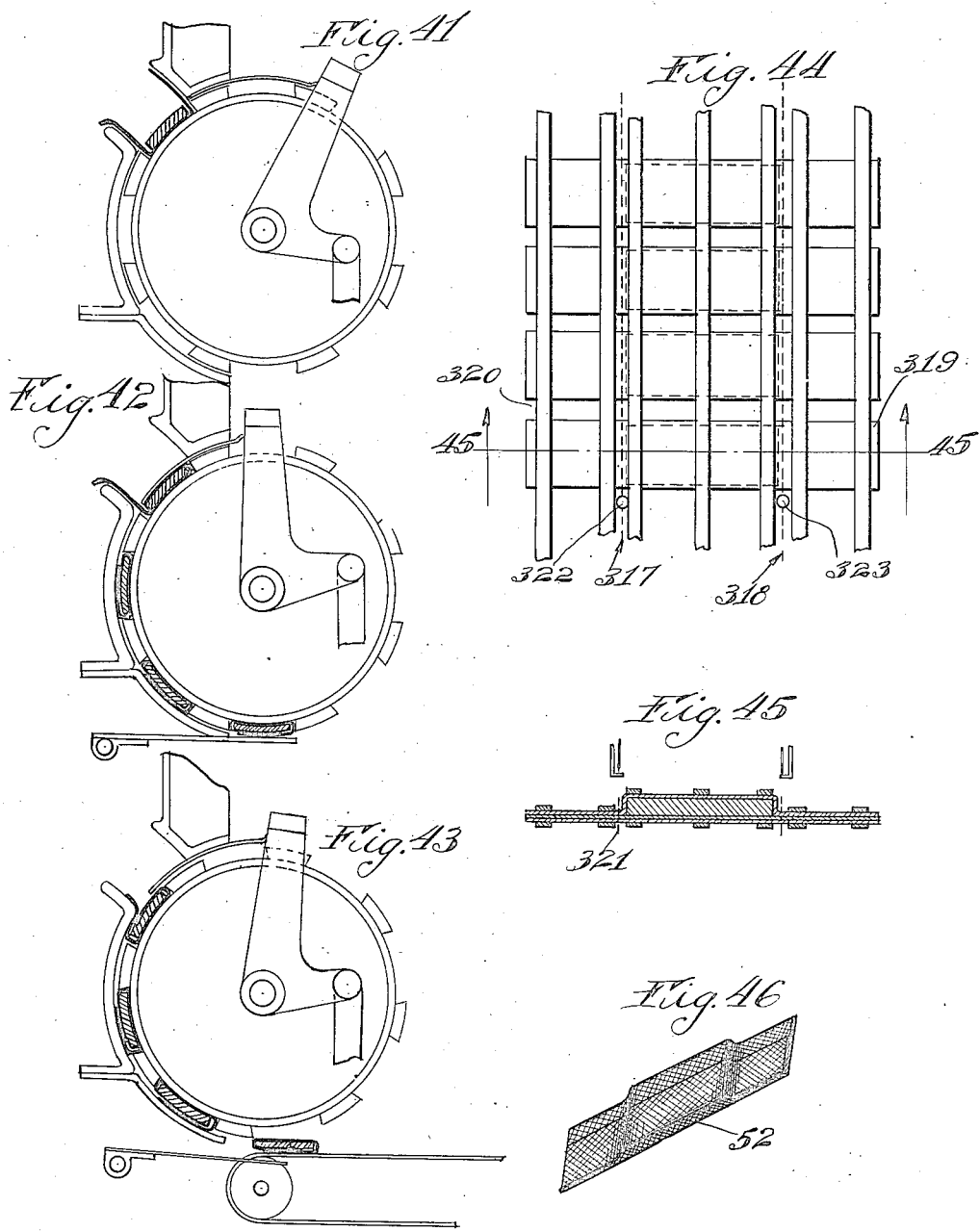

Patented Aug. 7, 1928.

1,680,268

UNITED STATES PATENT OFFICE.

GEORGE WEISS, OF CHICAGO, ILLINOIS, ASSIGNOR, BY MESNE ASSIGNMENTS, TO INTERNATIONAL CELLUCOTTON PRODUCTS CO., OF CHICAGO, ILLINOIS, A CORPORATION OF DELAWARE.

ABSORBENT-PAD MACHINE.

Application filed March 24, 1920. Serial No. 368,456.

My invention relates to improvements in machines for making absorbent pads such as sanitary napkins in which the pad material is enclosed in other material, such as cotton gauze. In the specific machine which forms the basis for the present invention the pad or absorbent material is formed of a section of multiply tissue paper having the necessary number of laminæ to form a pad of the desired thickness. Such material has been styled by one manufacturer "cellucotton" and is usually so described in the trade. It will be understood, however, that the invention is capable of other applications and uses than the one specifically described herein.

The principal objects of the invention are to provide a machine or apparatus of the class described which will receive the padding and the enclosing material therefor and deliver the completed product in a form which requires substantially no further treatment prior to being packed for sale; to provide an improved machine of the class described which will receive the padding and gauze, or other enclosing material, in roll form, the operations of severing the sections of padding and the gauze enclosures being performed automatically; to provide a machine of the class described in which the section of padding is automatically inserted into the gauze enclosure and thereafter secured in position in the gauze; to provide a machine of the class described in which the gauze enclosure with its containing padding are delivered automatically and continuously from the machine without attention from the operator; to provide a machine which shall be relatively simple and economical in design and manufacture and withal simple and inexpensive to operate and maintain; and in general to provide an improved machine of the character referred to.

In the drawings which illustrate my invention as applied to the specific machine heretofore referred to—

Fig. 4 is an enlargement of a portion of Fig. 1, certain parts being shown which for the sake of clearness were omitted from Fig. 1;

Fig. 5 is an enlarged side elevation of a portion of the machine showing the rear side thereof;

Fig. 6 is an enlargement of a portion of Fig. 3;

Fig. 7 is a section taken on the line 7—7 of Fig. 4;

Fig. 8 is a section taken on the line 8—8 of Fig. 1;

Fig. 9 is a section taken on the line 9—9 of Fig. 1;

Fig. 10 is a section taken on the line 10—10 of Fig. 9;

Fig. 11 is a section taken on the line 11—11 of Fig. 1;

Fig. 12 is a rear view enlarged of the beveled gear arrangement shown in Fig. 11;

Fig. 13 is a section taken on the line 13—13 of Fig. 11;

Fig. 16 is a section taken on the line 16—16 of Fig. 9;

Fig. 17 is a section taken on the line 17—17 of Fig. 6;

Fig. 18 is an enlargement of a portion of Fig. 1 showing the compressor and pad chute mechanism;

Fig. 19 is a view similar to Fig. 18 but showing the parts in a different position;

Fig. 20 is an end elevation looking in the direction of the arrow 20 in Fig. 6;

Fig. 21 is a section taken on the line 21—21 of Fig. 20;

Fig. 22 is an enlarged section taken on the line 22—22 of Fig. 20;

Fig. 23 is an end elevation looking in the direction of the arrow 23 of Fig. 3;

Fig. 24 is a side elevation looking in the direction of the arrow 24 on Fig. 23;

Fig. 25 is a section taken on the line 25—25 of Fig. 23, and showing the third cutting punch;

Fig. 26 is a view somewhat similar to Fig. 4, but showing certain parts in section and removed for the sake of clearness;

Fig. 27 is a section taken on line 27—27 of Fig. 7;

Fig. 28 is an elevation looking in the direction of the arrow 28 in Fig. 27 and showing also the grooved cam which was removed from Fig. 27 for the sake of clearness;

Fig. 29 is a section taken on the line 29—29 of Fig. 6;

Fig. 30 is a section taken on the line 30—30 of Fig. 29;

Fig. 31 is a cross-section through a segmental sweep or pusher;

Fig. 32 is a view looking in the direction of the arrow 32 on Fig. 31;

Fig. 33 is a plan view of Fig. 31;

Fig. 34 is a section taken on the line 34—34 of Fig. 6;

Fig. 35 is a side view of the part shown in Fig. 34;

Fig. 36 is a section taken on the line 36—36 of Fig. 34;

Fig. 37 is a section taken on the line 37—37 of Fig. 36;

Figs. 41, 42 and 43 are diagrammatic views of various stages of successive steps in the folding of the gauze around the pad;

Fig. 44 is a plan view of the delivery conveyor tapes, showing a series of articles being delivered;

Fig. 45 is a section taken on the line 45—45 of Fig. 44;

Fig. 46 is a perspective view of a specimen finished article.

Figure 1:
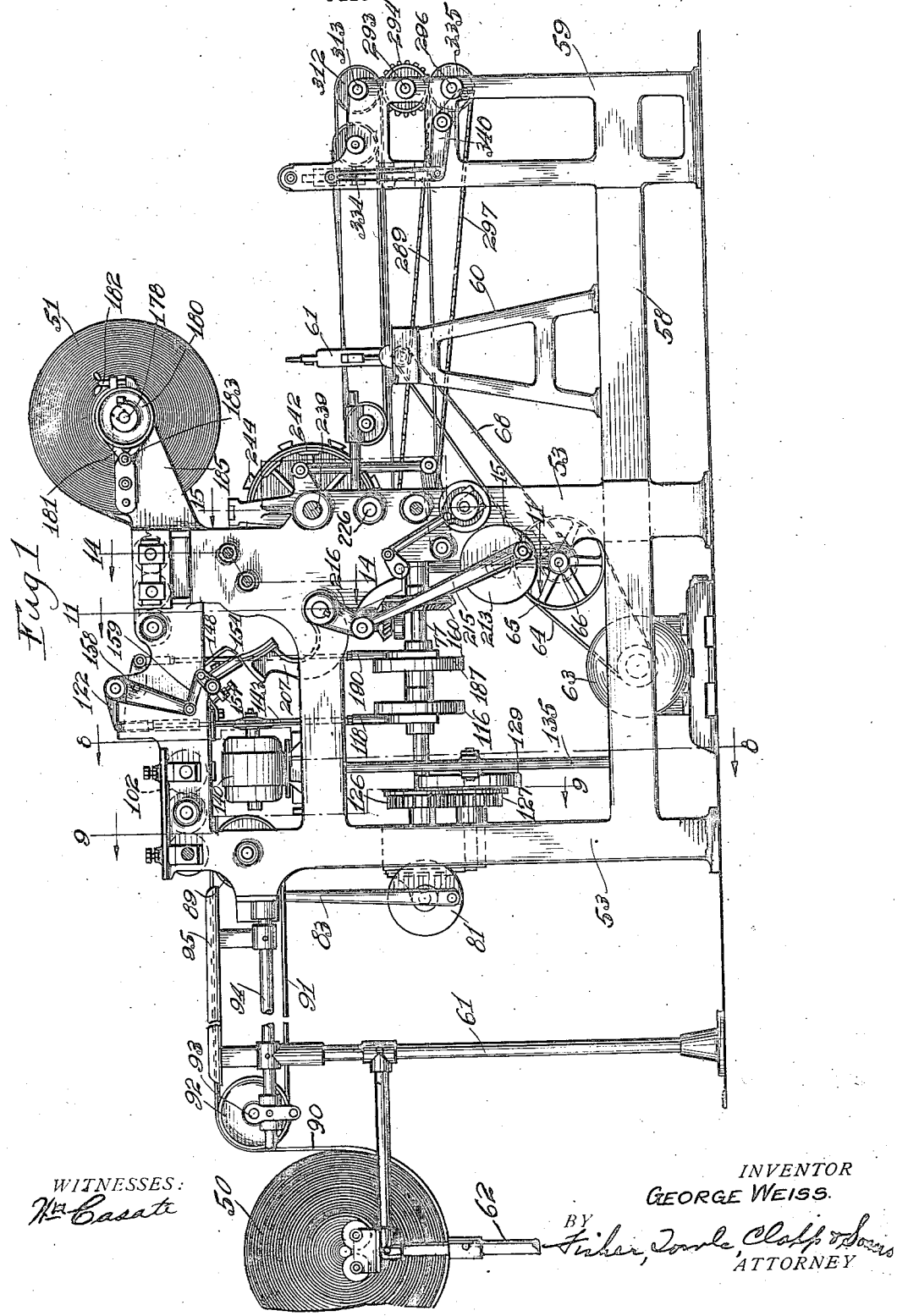
Fig. 1 is a front or side elevation of the machine.

As somewhat briefly stated in the preamble, the particular machine illustrated in the said drawings is designed to perform all of the steps necessary to deliver the finished product, the raw product entering the machine in the form of a roll of padding material and a roll of gauze, which is used to enclose the pad. In the drawings 50 represents the roll of absorbent pad material such as "cellucotton" and 51 represents the roll of gauze, the completed article being shown in perspective in Fig. 52. At any one time there are a number of articles being operated upon or passing through the machine, since the various mechanisms performing the different operations on the raw material or partially finished article parts operate serially. However, each cycle or revolution of the main operative member of the apparatus serves to deliver one article, various operations being performed simultaneously on different articles, all of which are passing through the machine at the same time.

The complete cycle of operation may be stated briefly as follows:

The end of the roll or strip of "cellucotton" is fed step by step forwardly into the machine, each step corresponding to the length of pad material necessary for one napkin. During the interval between the forward movements of the pad strip the same is compressed and while compressed is severed by a movable circular saw, or cutting disk.

The pad is then delivered into a swinging chute which conducts it into the seat of a segmental arm sweep or pusher.

Meanwhile a strip of gauze of the required length has been similarly stepped forward and severed by other mechanism, the severing taking place while the strip is suspended in the air in front of the pad, then carried by the segmental arm which is in the act of commencing its swinging movement. At the instant when the strip of gauze is severed or immediately before the severing operation the pad carried by the sweep engages the gauze, which is carried with the pad into the pocket or groove of a folding drum, which at that time is stationary. After delivery into the pocket of the folding drum, and when the drum is still stationary, an arc-shaped folder is operated to fold one end of the gauze over the pad, whereupon the drum starts to rotate and the other end of the gauze is folded over the first folded end by a stationary shoe. Meanwhile fillers have, prior to the folding, been inserted at the ends of the pad so that the folding over of the ends of the gauze will be most efficiently effected.

Further step by step movements of the drum carry the parcel of padding to the receiving end of the delivery belt, the fillers having been previously withdrawn from the ends of the parcel which is then deposited by means of a set of swinging fingers. The tapes of the conveyor then carry a series of parcels into the field of a sewing machine which sews the folds of gauze together at either side of the absorbent pad. The sewed parcels then form a continuous series connected together at two points by a short length of thread which is cut away by a reciprocating punch mechanism, thus separating the series into separate napkins.

Referring to the drawings, particularly to the first three figures, it will be observed that the principal parts are mounted upon the main frame of the machine which comprises a pair of longitudinally extending cast iron frame members 53 and 54, which are connected together with a series of transverse frames or girders, as for instance 55, 56, 57. Longitudinal extensions 58 and 58' of said main frame connect with end frame members 59 supporting a portion of the delivery mechanism. A-frames 60, carry the sewing machine head 61, and suitable supporting standards 61ª and 62 carry the ends of the feed conveyor and the cotton roll 50.

The power for operating the various instrumentalities is preferably derived from a constantly running electric motor 63 which through a belt 64 drives a pulley 65 keyed to the power shaft 66. Referring now to Fig. 7 it will be seen that on the end of the said shaft there is keyed a belt pulley 67 which drives the sewing machine 61 through a belt 68. Said sewing machine operates continuously and need not be further described, except to state that it has two sewing heads or needles spaced apart sufficiently to straddle the pad.

The shaft 66, which is rotatably supported in suitable bearings forming parts of the main frames is further equipped with a spur pinion 69 which meshes with a large spur-gear 70 keyed to a sleeve 71 rotatably supported on the end of a shaft 72. The shaft 72 is rotatably supported in the main frame of the machine but is not fixedly connected to the sleeve 71 which rotates on said shaft. The sleeve 71 is formed with pinion teeth 72ª which mesh with a large gear 73 keyed to the end of a third transverse shaft 74, also rotatably mounted in suitable bearings in the main frame of the machine. Said shaft 74 may be considered to be the main cam shaft of the machine from which all of the timed or synchronized operating parts are driven. Said shaft 74 drives a shaft 226 through a pair of spur gears 224 and 225, having the same number of teeth.

*Cotton feed mechanism.*

Referring now to Fig. 6, it will be seen that on said shaft 226, there is keyed a beveled gear 75 which meshes with a corresponding beveled gear 76 keyed to the end of a side shaft 77.

Referring now to Fig. 16, it will be seen that on the end of said shaft 77 there is keyed one gear 78 of a pair of multilated gears 78 and 79. The dimensions and arrangement of the said beveled gears 78 and 79 are such that one revolution of the shaft 77 will drive shaft 80 one revolution, but there will be an interval of approximately one-third of a revolution of shaft 77 during which the shaft 80 is idle. It will be understood that the shaft 77 rotates at the same speed as the main cam shaft 74 by reason of the fact that the gears 75 and 76 have the same number of teeth, (see Fig. 6), and that shaft 226 runs at the same speed as shaft 74.

Referring now to Fig. 9 it will be noticed that on the end of the shaft 80 is a crank disk 81 which is fitted with a crank pin 82 for the purpose of reciprocating a vertically arranged pitman 83.

Referring now to Fig. 10 it will be seen that the pitman 83 has its upper end pivotally connected to a rocker arm or bell-crank 84 journaled loosely on a transverse shaft 85. The vertical arm 86 of said bell-crank carries a pivoted pawl 87 adapted to engage in the notches of a ratchet wheel 88. The said ratchet wheel 88 is keyed to the said shaft 85 which carries a drum or roller 89 of the necessary width to accommodate the strip of cellucotton 90. It will be understood that each effective reciprocation of the pitman 83 will cause a rotary movement of the drum 89 sufficient to move its circumference approximately a distance equal to the width of padding which it is desired to sever for each article.

As shown in Fig. 1 the cotton 90 is not directly supported by the roll 89 but is carried on an endless belt 91, the outer end which passes over an idler roll 92 adjacent the reel 50 of cotton. The idler roll 92 is carried on a shaft 93 supported in bearings capable of being moved longitudinally along the side rods 94 so as to enable the belt 91 to be tightened when it becomes slack. In order to prevent the cotton strip 90 from drifting off one side of the belt 91, I prefer to enclose the upper stretch of said belt 91 with a channel shaped guide chute 95 which extends substantially the entire distance of the top stretch of said belt.

Again referring to Fig. 9, it will be observed that on the end of the shaft 85 there is keyed a spur-gear 96 which meshes with a rather smaller spur-gear 97 keyed to the end of a transverse shaft 98 pivotally supported in the frames of the machine and to which is keyed or pinned a roller 99 similar to the roller 89 but of less diameter, its diameter corresponding to the relative diameters of the gears 97 and 96, so that the circumference thereof will move at the same rate as the circumference of the drum 89.

Figure 2:
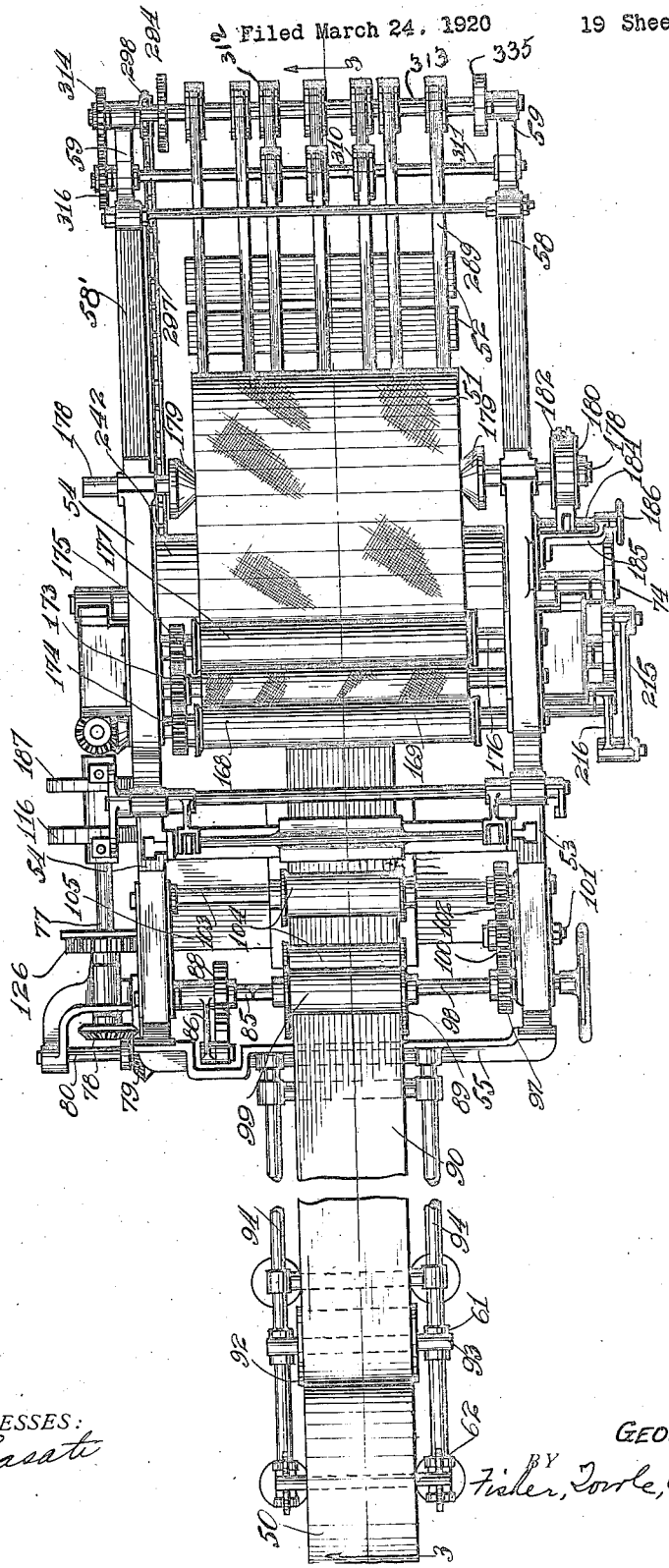
Fig. 2 is a plan view thereof.

Referring now to Fig. 2, it will be observed that the gear 97 also meshes with the intermediate gear 100 loosely journaled on a stud or pin 101 secured on the side frame 53, said gear 100 serving to transfer the movement of the gear 97 to a gear 102 keyed on a transverse shaft 103 similar to the shaft 98. It will be understood that the gears 97 and 102 are of the same diameter and that the roller 99 is of the same diameter as a corresponding roller 104 keyed on said shaft 103, the circumferences of all of said rollers traveling at substantially the same speed as the rate of travel of the cotton strip 90.

Figure 3:
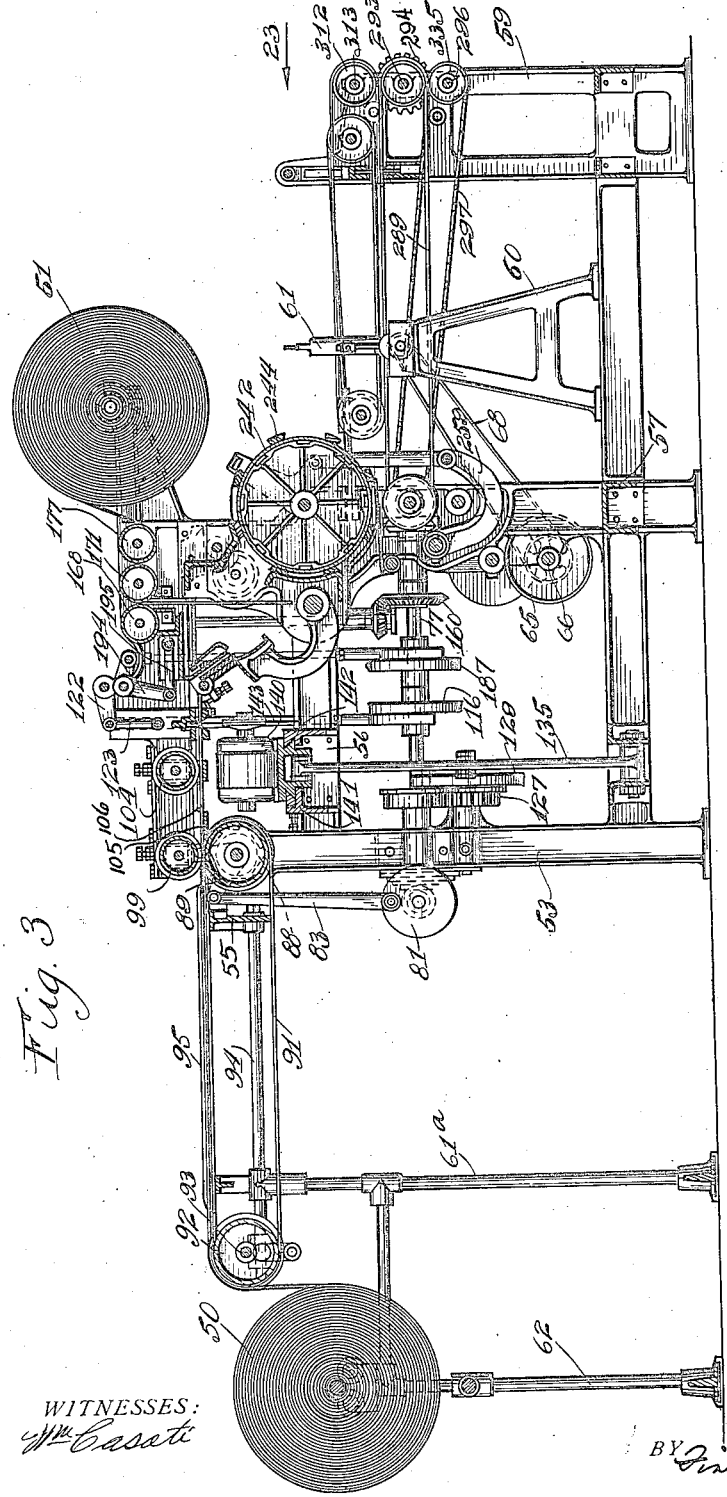
Fig. 3 is a section taken on the line 3—3 of Fig. 2.

Referring now to Figs. 3 and 17, between the side frames 53 and 54 there extends a pair of bars one of which is designated 105 which carry a thin plate or sheet plate 106, serving as a support for the cotton strip 90.

*Compressor.*

A plate 106 extends from the end of the belt 91 and conducts the cotton under the compressor head, which is shown best in Figs. 6 and 17. Said compressor head serves to compress and hold the strip of cotton while a section of the desired length is being severed, said severing being effected by a constantly running circular saw which is swept through the strip while so held by the compressor head.

Referring now to the details of the compressor head, 107 and 108 represent the two parts of a transverse bar separated by a transverse slot 109, said bar being supported between the side frames of the machine. Bars 107 and 108 respectively serve as supports for the end of the plate 106 and an extension thereof 110 beyond the slot 109. The punch portion of the compressor comprises a shoe or foot 111 having in the under side a slot 112 corresponding in position with the slot 109 between the parts 107 and 108. As best shown in Fig. 17, the shoe 111 is carried in the middle of an I-shaped casting 113, the outer ends of which are formed with slide pieces 114 and 115 arranged to reciprocate vertically in suitable guides in the side frames.

*Compressor operating mechanism.*

On the shaft 77 there is keyed a cam 116 having a cam groove in its face, said cam groove serving to accommodate a cam roller 117 rotatably supported on a cam rod 118. The lower end of said cam rod is slotted as shown at 119 in order to be guided by the shafts 77 which it straddles. The upper end of the cam rod 118 is pivotally connected to the arm 120 keyed to a transverse shaft 121 pivotally mounted in the side frames of the machine. On said shaft 121 there are keyed a pair of inner arms 122, the ends of which are pivotally connected to pitmen 123, the lower ends of said pitmen 123 being pivotally connected to pins 124 fixed in the slides 114 and 115. It will be manifest that rotation of the cam 116 will effect suitably timed oscillation of the shaft 121 and thus cause the cotton to be compressed between the foot 111 of the compressor and the parts 107 and 108.

*Cotton saw or knife.*

Referring to Fig. 16 it will be observed that on the shaft 77 there is keyed one of a pair of mutilated spur-gears 126 and 127, said gears being so organized that for each revolution of the shaft 77 the spur-gear 127 which revolves on a fixed pin 128, will make one-half of a revolution. It will also be understood that the spur-gear 126 (see Fig. 9), having teeth on one-half only of its circumference, will be effective to rotate the gear 127 during one-half only of each revolution of shaft 77.

Referring now to Fig. 8, 129 is a crank disk suitably united by means of pins 130 to the stop plate 131 of the driving mutilated gear 127 so that the crank disk 129 will make one revolution for each revolution of the driving gear 127. Hence, during half a revolution of the shaft 77 the crank disk 129 will be rotated through half a revolution, and during the remaining portion of the revolution of the shaft 77 crank disk 129 will be idle.

Referring now to Fig. 8, it will be seen that on the crank disk 129 is a pin 132 which is connected by means of a pitman 133 to a pin 134 mounted at the approximate center of an outstanding lever 135, the lower end of which is pivoted on a pin 136 carried by one of the cross frames. The upper end of the lever 135 is connected by a short link 137 with a pin 138 carried by the under side of a slide piece 139 on which the saw motor 140 is mounted. Said slide piece 139, as shown best in Fig. 3, is carried slidably between a pair of guides 141, 142 extending transversely across the machine so that each stroke of the pitman 133 will cause the slide 139 to be moved from one side of the machine to the other. The motor 140 is so located on the slide 139 that a saw or knife 143, carried by the shaft of the motor 140, will extend through the slot 109 and into the slot 112 of the pressure shoe. The throw of the crank 132 is sufficient to cause the saw to sweep through the entire width of the cotton strip 90, so that when the crank disk 129 is rotated one-half of a revolution, a section of the padding will be completely separated from the end of the strip 90.

*Cotton chute.*

The separated section 144 (see Fig. 6) of the cotton strip is, after severing, supported on the extension plate 110 and there remains until a further movement of the strip 90 pushes it further along in its travel through the machine. At the delivery end of said extension plate 110 there is a transverse shaft 145 rotatably supported in the side frames of the machine and on said shaft 145 there are pinned a pair of spaced blocks or arms 146 (see Fig. 11). Said bars 146 are connected together by a pair of bars 147 and 148, which serve as supports for a plate 149 forming the bottom or floor of the cotton chute and a sheet 150 forming the roof thereof. The plate 149 and sheet 150 are spaced far enough apart to conveniently admit the pad section 144 when the latter is pushed forwardly from off the extension plate 110.

Loosely mounted on the shaft 145 are a pair of small arms or lugs 151 straddling the keyed arms 146 and to said loose arms or lugs 151 there is secured a transverse bar 152 on the top of which bar is mounted a guard plate 153. Said guard plate 153 has its end bent at an angle, as shown at 154, so that when the shaft 145 is rocked to bring the chute into horizontal position the guard 154 will close the outer end of the chute only. Hence, the movement of the cotton section 144 will be arrested and controlled. However, when the cotton chute is in dumping position, as shown in Fig. 6, the guard 154 is raised relatively so as to expose the end of the chute by reason of the swinging movement of the guard plate 153 being arrested ahead of the chute and before the shaft 145 has rocked completely into dumping position. Such arresting of the movement of the guard member is effected by a small stationary lug 155 bolted to the under side of the transverse member 108 (see Fig. 6) and the end of which is engaged by a screw 156 adjustably carried in a small lug 157 formed as an extension of one of the lugs 151.

Referring to Figs. 17, 18 and 19, on the shaft 121 I key a depending arm 158 the lower end of which is connected by means of a short link 159 to the upper end of a small arm 160 keyed to the end of the shaft 145. Hence, it will be manifest that when the shaft 121 is rocked to operate the compressor, the shaft 145 will also be rocked to dump the cellucotton chute.

Gauze feed.

Referring to Figs. 5, 6, 11, 12, and 13, 160 is a large mutilated beveled gear keyed to the shaft 77 and arranged to mesh with a mating beveled gear 161 keyed to the lower end of a vertical shaft 162 mounted to rotate in bracket bearings 163, 164 bolted to the side of frame member 54. As shown in Fig. 12, said gear 160 has half of its teeth cut away so that it will only be effective to rotate the pinion 161 during one-half of a revolution of the constantly running shaft 77. Hence, the vertical shaft 162 which drives the gauze feed will operate one-half of the time. The upper end of said shaft 162 carries keyed thereto a beveled gear 165 which meshes with a corresponding beveled gear 166 keyed to the end of a horizontal transverse shaft 167 rotating in bearings in the side frames of the machine. To the said shaft 167 is keyed a roller 168 of sufficient length to accommodate the width of a strip of gauze 169 as it comes from the gauze roll 51. It will be observed that the roller 168 is flanged as at 170 in order to prevent the gauze drifting sidewise. Between said flanges there is a second roller 171 which is keyed to a similar rotatable shaft 172, said shaft being driven by a spur-gear 173 keyed to the end of said shaft and meshing with a similar spur gear 174 keyed to the roller shaft 167. Said spur-gear 173 also meshes with another similar spur-gear 175 keyed to the end of another similar shaft 176 carrying a roller 177 similar to the roller 167 and similarly flanged.

The rollers 167, 172 and 177 may if desired be faced with flexible or slightly resilient material and have substantially the same diameter so that they will all of them be effective to feed the gauze strip forward, the pressure between said rollers being sufficient to prevent slippage of the gauze strip. It will be understood that the ratio between the mutilated gear 160 and the pinion 161 in conjunction with proper selection of diameter for the gauze rollers is effective to feed the gauze strip forward the required distance for each revolution of the side shaft 77.

Preferably it is desirable to have some means for checking the free rotation of the gauze roll 51 which is shown as supported on the shaft 178 extending through both side frames and rotatably supported therein. Said shaft is equipped with a pair of cones 179 which may be moved toward each other to clamp the gauze roll 51 tightly between same. The shaft 178 floats in its bearings and is positioned laterally through the brake mechanism which, as shown in Fig. 1, comprises a flanged brake drum 180 keyed to the front end of said shaft 178. Said brake drum accommodates the two halves of a brake strap 181 capable of being forced together and tightened by a suitable clamping screw 182. The pivot 183 connecting the two halves of the brake strap 181 is internally threaded to receive the screw 184 positioned longitudinally but free to rotate in a bracket 185. The outer end of said adjusting screw 184 which projects through said bracket 185 is equipped with a hand wheel 186 by which the lateral position of the gauze reel may be conveniently adjusted.

Gauze shear.

Referring to Figs. 6 and 34, 187 is a cam keyed to the shaft 77 and having a suitable cam groove 188 formed therein and accommodating a cam roll carried by a pin 189 on the lower end of the cam rod 190. The lower end of said cam rod 190 is forked or slotted to straddle the shaft 77 and the upper end of the cam rod 190 is pivotally connected at 191 to the outer end of an arm 192 keyed to a shaft 193 extending transversely between and rotatably supported in the side frames of the machine.

As shown best in Fig. 6, on each end of the shaft 193, but within the side frames, there is keyed a depending arm 194, the lower end of which is pivotally connected to one end of the link 195. The other end of each of said links 195 is pivoted on a pin 196 secured on the side of one of the slides 197 for the gauze shear, the effective portion or knife of which is indicated at 198 in Fig. 6. Said slide pieces 197 are suitably guided at each side of the machine so as to insure a smooth horizontal movement of the shear knife 198 when the shaft 193 is rocked. The stationary part or knife 199 of the gauze shear mechanism is supported on a small shelf 200 extending across the machine between the side frame thereof. By reference to Figs. 36 and 37 it will be noticed that the knife member 198 is not straight but is made with a pair of blunt points 200ª which assist materially in cleanly cutting the gauze without danger of tearing while at the same time preventing the material from being cut unevenly and thereby dropping down at one side before the other side has been completely severed. Preferably in order to prevent the end of the strip from becoming displaced after the gauze section is severed therefrom, and also to insure a correct feeding of the gauze, I prefer to supply a pair of vertically extending spaced gauze guide plates 201 and 202 just above the sweep of the shear and having their upper ends substantially engaging the surfaces of the rollers 168 and 172. It will be understood that when the gauze shear is operated the section of gauze will, unless otherwise controlled, drop vertically, as shown in Fig. 6.

*Segmental sweep.*

When the pad section supported by the saw and conducted into the pad chute has been discharged therefrom by the rocking of the shaft 145 into the position shown in Fig. 6, the pad 203 is received on the face 204 of a sheet metal sweep, the lower edge of which is equipped with a forwardly projecting flange 205 and the upper end of which is formed with a rearwardly bent arcuate flange 206. Said sweep is supported on the outer ends of three segmental C-shaped arms 207, 208 and 209 keyed to a transverse rock shaft 210 rotatably supported in bearings of the side frames.

Referring now to Fig. 7, on the shaft 74 there is keyed a large mutilated beveled gear 211 which meshes with a smaller spur gear 212 keyed to the shaft 72 previously referred to. The outer end of said shaft 72 carries keyed thereto a crank disk 213 having a crank pin 214. To the crank pin 214 there is pivotally connected the lower end of a pitman 215, the upper end of which is pivotally connected to the arm 216 keyed to the outer end of the shaft 210. It will be understood that mutilation of the gear 211 is such that during a portion only of the revolution of the constantly running shaft 74 the shaft 72 will make a complete rotation, while said shaft 72 will be idle during the remaining portion of the revolution of the shaft 74. The mutilated gears 211 and 212 are so timed that the forward oscillatory movement of the shaft 210 will be substantially half completed by the time that the shear 198 severs the gauze section, so that the fuzzy surface of the cotton will engage the side of the gauze section and prevent same from falling vertically when it loses its connection with the strip 169. The farther movement of the sweep carries the pad section and the gauze section into and through a transversely extending passageway 217 formed by a pair of castings 218 and 219 extending transversely between the side frames of the machine and spaced apart a sufficient distance to admit the gauze and pad in the manner indicated in Fig. 6. It will be observed that the walls 220 and 221 of said passageway are arcuate in section, the center of the arc being the center of the shaft 210, the edges 222 and 223 of said castings 219 and 218 being effective to bend the margins of the gauze section at right angles to the central or intermediate portion.

Referring to Fig. 27, the part 211ª represents the dwell in the retracted position of the segment arm to allow time for the pad to be received, and 211ᵇ causes a dwell in the removement of the arm after the pad is deposited in the pocket of the receiving drum.

*Filler inserting mechanism.*

Referring to Fig. 7 it will be observed that on the shaft 74 there is keyed a spur-gear 224 which meshes with a similar spur-gear 225 keyed to the outer end of a transverse shaft 226 constantly rotating in bearings in the side frames of the machine. On the other end of said shaft 226 there is keyed a sprocket 227 which by means of a chain 228 (see Figs. 5 and 14) drives a sprocket 229 keyed to the outer end of a transverse shaft 230 rotatably supported in bearings of the side frames.

Figure 14:
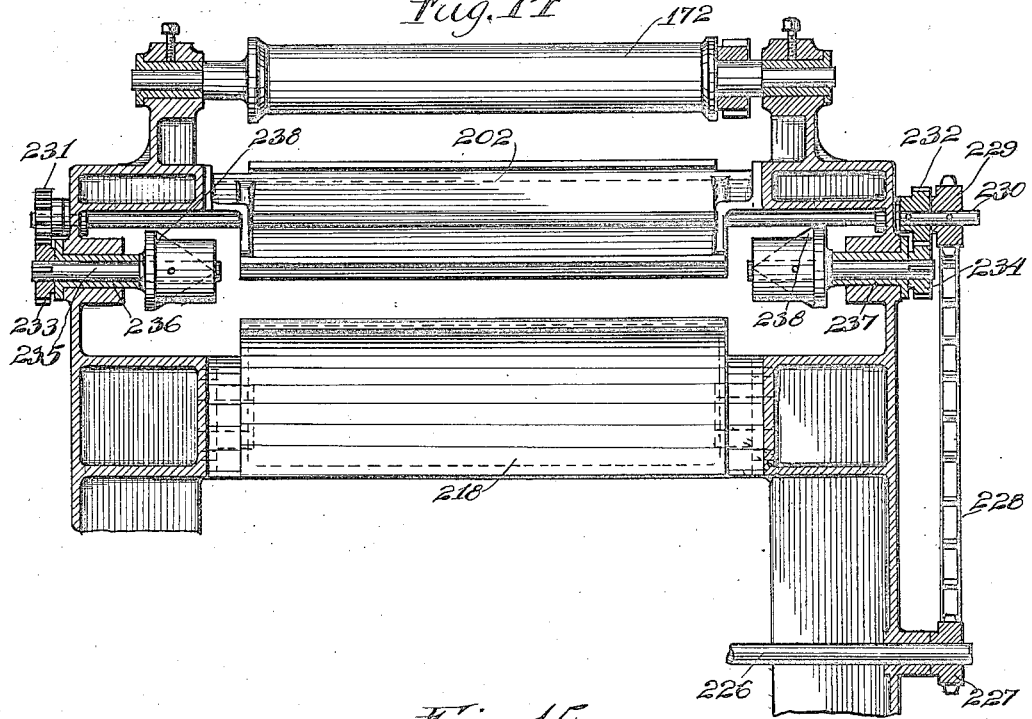
Fig. 14 is a section taken on the line 14—14 of Fig. 1.
Figure 15:
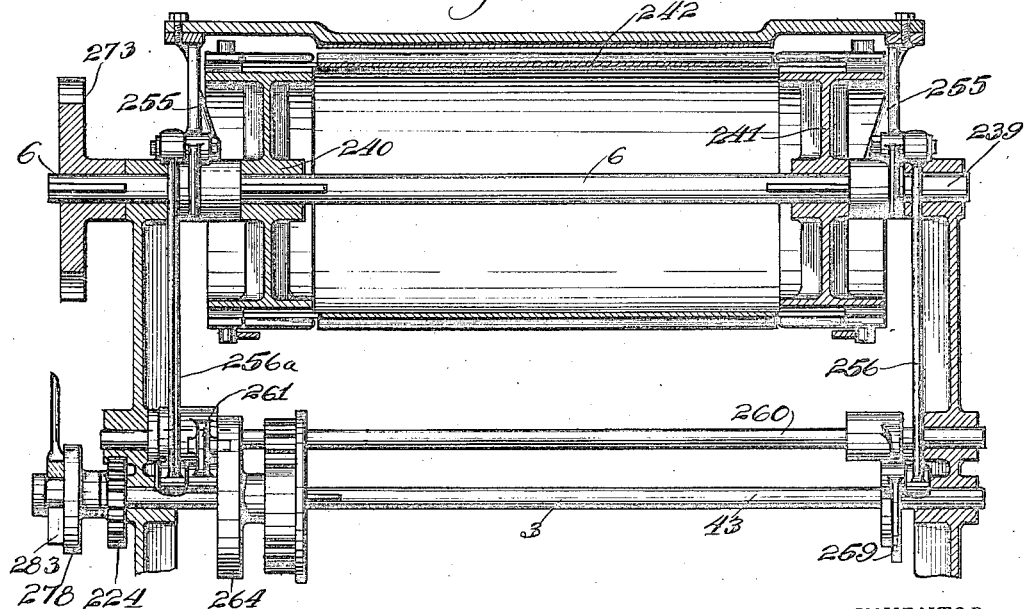
Fig. 15 is a section taken on the line 15—15 of Fig. 1.

As shown in Figs. 5 and 14, the shaft 230 at either end thereof is equipped with small gears 231 and 232 which mesh with similar gears 233 and 234 keyed to the outer ends of similar stub shafts 235 rotatably supported in bearings 236 and 237 in the side frames. The inner ends of said shafts 235 are equipped with pen shaped or longitudinal cams 238, that is to say, the cam track is a portion of a cylinder co-axial with the axis of the cam shaft. Said cam shafts 235 rotate continuously and serve to move the fillers inwardly as will be described later.

Figure 39:
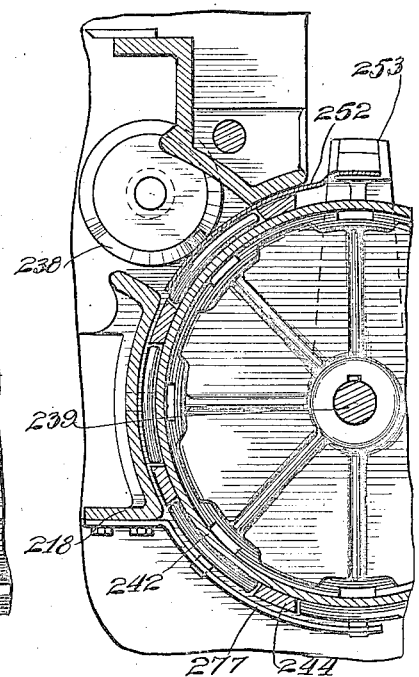
Fig. 39 is a section taken on the line 39—39 of Fig. 38.

Referring now to Figs. 7, 20 and 39, it will be observed that there is a shaft 239 rotatably supported in the side frames of the machine, said shaft having keyed thereon a pair of spiders 240 and 241. Said spiders are spaced apart and are connected together by means of a steel cylinder or drum 242 which overlaps and is secured to the peripheries of the said spiders 240 and 241. The surface of the said drum is divided into eight pockets 243 by means of eight longitudinal strips 244 bolted or riveted to the outside of the said drum 242, the pockets being somewhat longer longitudinally than the width of the gauze strip 169 used for enfolding the padding. The spiders 240 and 241 are also each formed with a set of eight guideways 245 aligned with the pockets 243 and slidably receiving the tongues 246 of filler plates 247 arranged to slide longitudinally of the drum and enter the said pockets 243. In order to prevent the filler plates 247 from becoming displaced radially of the spiders the tongues 246 are grooved out at their junctions with the body portions of the filler plates to receive the edges 248 of slots cut in the ends of the drum sheet 242. Said slots 249 extend longitudinally of the drum sheet a sufficient distance to permit the filler plates 247 to move longitudinally of the drum far enough to almost engage the ends of the pad sections and in effect form continuations thereof, being of substantially the same thickness or cross-section.

The purpose of the filler plates 247 being to facilitate the folding of the gauze around the pad sections, it will be manifest that it will be necessary to move the same into position as continuations of the pad section immediately after the operation of the sweep 204 has placed the article in the position shown in Fig. 6 and before the margins of the gauze have been folded over the pad. This is effected by longitudinal cams 238, previously described, suitably located to cooperate with circular cam pins 250 (see Fig. 38) carried by the outer ends of the filler plates 247, said Fig. 38 showing the position of the said parts after cams 238 have done their work in causing the filler plates to move longitudinally in the pockets.

*Gauze folding mechanism.*

Figure 38:
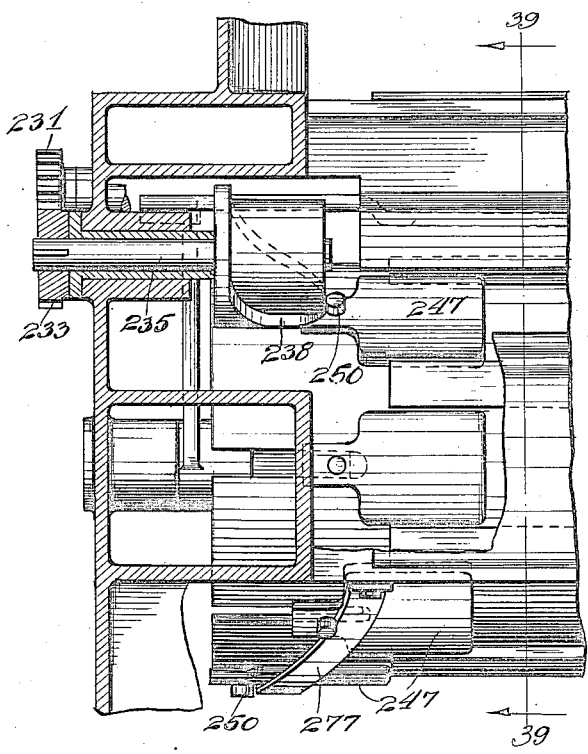
Fig. 38 is a section taken on the line 38—38 of Fig. 6.

After the filler plates 247 have been moved to the position shown in Fig. 38 as continuations of the pad section, the upper margin or edge 251 is folded over by an arc-shaped folder 252 which extends longitudinally in accordance with the length of the gauze. Said folder 252 is secured on a transverse bar 253 extending between and carried by the ends of the arms 254 of a pair of bell-cranks 255 journaled on the shaft 239 between the spiders and the frames. Said folder bell-cranks are actuated by pitmen 256 and 256ª at the respective sides of the machine and connected at their upper ends to the short arms 257 of the said bell-cranks.

One of the pitmen 256 has its lower end pivotally connected to the outer end of an arm 258 which, as shown in Fig. 6, is made with a drop 259 to avoid other mechanism and is keyed to one end of the transverse shaft 260 so that when said shaft 260 is oscillated the arm 258 is rocked to operate the folder 252. The other pitman 256ª at its lower end is pivotally connected to an outer end of the straight arm 261 also keyed to the end of the rock shaft 260, so that when the arm 261 is actuated both pitmen 256 and 256ª will be actuated in unison, said arms 258 and 261 being of equal effective length. Said rocking system is actuated by a cam roller 262, indicated in dotted lines in Fig. 4 and in section in Fig. 7, said cam roller operating in a groove 263 formed in a cam 264 keyed to the constantly rotating main cam shaft 74. Fig. 6 shows the folding plate 252 before it has folded the gauze, and Fig. 39 shows its position after operation and before retraction.

*Folding drum.*

Immediately after the arc-shaped folder 252 has been operated but before it has been withdrawn, the drum is given a one-eighth turn in a direction to move the article downwardly, said downward movement of the package resulting in the folding of the edge or margin 265 over the edge of the folder 252. Said rotary movement of the drum is effected by the train of mechanism, as follows:

Referring to Figs. 4 and 7, it will be observed that on the shaft 226 there is a gear 225 which meshes with a spur-gear 266 journaled on a fixed stud 267 projecting from the side frame 53, the diameter of the gears 266 and 224 being alike so that the gear 266 will revolve at the same speed as the main cam shaft 74. As shown in said Fig. 4, the gear 266 rotates in the direction of the arrow 268. On the outer face of gear 266 and rigidly united thereto is a disk 269 carrying a pin 270 on which is journaled the pin roller 271 of the necessary required diameter to enter the slots 272 of an eight armed Geneva wheel 273 keyed to the outer end of the drum shaft 239. The wings 274 of the Geneva wheel are formed with circular depressions 275, with which co-operates the segmental circular stop flange 276 formed as an integral part of the disk 269. It will be manifest that by the above mechanism one revolution of the main shaft 74 will cause a one-eighth turn of the drum, the active portion of the revolution taking place during approximately one-third of the total movement, so that during two-thirds of the movement of the gear 266 the drum shaft 239 is held stationary by reason of the stop flange 276 being in engagement with one of the circular depressions 275 of the Geneva wheel 273.

*The filler plate withdrawing mechanism.*

The longitudinal cams 238 previously referred to do not effect the withdrawal of the filler plates which are retracted by means of a stationary curved cam 277 (see Figs. 38 and 39) said cam 277 being bolted to the lower end of the transverse frame member 218 and being engaged by the cam pins 250 during a further stage in the rotation of the folding drum.

The depositing fingers.

Referring to Figs. 4, 6 and 7 it will be observed on the outer end of the main shaft 74 there is keyed a cam 278, having formed therein a cam groove 279 in which rolls a cam roll 280 carried by a pin 281 on a cam rod 282. The lower end of said cam rod is forked, as shown at 283, so that it will straddle and be guided by the outer end of the shaft 74 and the upper end of said cam rod 282 is pivotally connected at 284 to the outer end of a short arm 285 keyed to the end of a rock shaft 286. On said rock shaft 286 there are keyed a series of small blocks, as for instance 287, (see Fig. 7) on which are carried a series of fingers 288 (see Fig. 6). During the period of movement of the drum the fingers 288 are raised into the position shown in Figs. 4 and 6, and thus prevent the parcel from prematurely falling from the pocket of the drum. However, as soon as the movement of the drum is arrested, the fingers, which then support the parcel, are dropped and the parcel falls onto the delivery mechanism. The series of curved strips 288ª serve to retain the package during the lower portion of its movement.

Delivery mechanism.

Said mechanism comprises a series of belts 289 which are trained around a series of flanged pulleys 290 revolving idly on the shaft 226 between suitable collars 291 (See Fig. 7). The other ends of the belts 289 are trained around a set of driving pulleys 292 (see Figs. 3 and 24) which are positively actuated by the shaft 293 on which said pulleys are keyed. The shaft 293 is journaled in the end frames 59 and on said shaft is keyed a spur-gear 294 meshing with a driving spur-gear 295 on a lower transverse shaft 296 (see also Fig. 23). The shaft 296 is positively driven by a chain 297 trained around a sprocket wheel 298 keyed on said shaft 296 and a sprocket wheel 299 keyed on the constantly running shaft 226.

Figure 40:
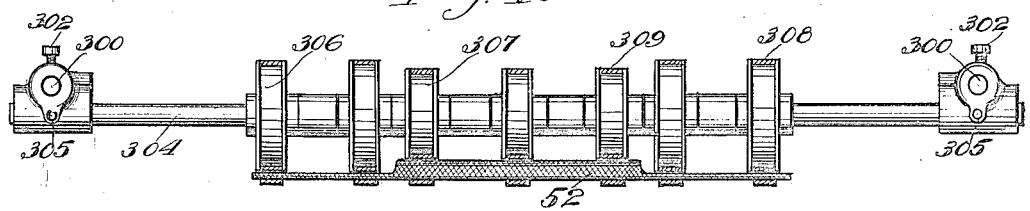
Fig. 40 is a section taken on the line 40—40 of Fig. 4.

Referring now to Figs. 4 and 40, the numerals 300 represent a pair of longitudinally extending stationary guide studs rigidly mounted in the main side frames, and on said rods 300 there are adjustably mounted a pair of small blocks 301 capable of being fixed as to longitudinal position by set-screws 302. The lower portions of the said blocks 301 are formed with lugs 303 apertured to receive the ends of a fixed transverse shaft 304 prevented from rotating by set-screw 305. Said shaft 304 serves as a fixed supporting spindle on which rotate freely a set of seven idler pulleys, namely, two pairs of large diameter outside pulleys 306, and three pulleys 307 of smaller diameter and located between the two pairs of outer pulleys 306. All of said seven pulleys serve as idlers for the guide belts, the two outer pairs of which 308 overlie the thin ends of the package while the three inner guide belts 309 by reason of the small inner pulleys 307 are raised to accommodate the thicker or pad portion of the package. The three inner guide belts 309 are trained around a set of pulleys 310 keyed to a shaft 311 journaled between the end frames 59 and the four outer belts 308 pass around pulleys 312 keyed to a similar shaft 313 also journaled in the side frames 59. The shaft 313 is driven by the intermeshing spur gears 314 and 315 keyed respectively to the outer ends of the shafts 313 and 293 and the shaft 311 is driven by a spur gear 316 (see Fig. 2) keyed on the ends of the shaft 311 and meshing with the gears 314. Hence, all of the guide belts, upper and lower, will travel at a uniform linear speed, the driving shafts 293, 313 and 311 all moving continuously at the same speed and the driving pulleys 292, 312 and 310 being all of the same dimensions.

The sewing mechanism.

As indicated in Figs. 1 and 3, the sewing machine 61 is constantly driven by means of a belt 68 and the heads of the sewing machine are so positioned as to sew a continuous line of stitching along each of the lines 317 and 318 (see Fig. 44), the traveling parcels 319 being thus sewed together by the stitching thread extending between the successive parcels. It will be understood that the speed of the conveyor belts is such that there will be a slight interval 320 between successive parcels. As shown in Figs. 44 and 45, the second and third belts, counting from the outside, hold the margins of the pad and the angle of the gauze in position as the parcels pass through the zone of the stitching head, the stitch being inserted between said belts and substantially in the angle of the gauze, as shown clearly at 321 in Fig. 45.

Separating mechanism.

Means for separating the connected series of napkins consists of a punch and die mechanism indicated in Fig. 25, two of said mechanisms being employed and being positioned substantially as indicated diagrammatically at 322 and 323 in Fig. 44. The punch 324 is of sufficient diameter to punch out a substantial section of the thread which drops down onto the floor or into a suitable receptacle through the tubular die support 325 in which the die 326 is inserted. The die supports 325 are carried upon a suitable transversely extending frame member, indicated at 327 in Fig. 23.

The punches 324 are mounted in cylindrical holders 328 set into the under side of a transversely extending cross head 329 (see Fig. 23), said cross head having at its ends slides 330 and 331 which are arranged to be slidably supported in suitable guides formed in the side frames 59. Also in order to insure perfect registration of the punches 324 and the dies 326 dowel pin guide rods 332 rigidly secured in the cross head 329 are arranged to slide in vertical apertures drilled through the bosses 333 on the die supporting cross frame 327. The cross head 329 is reciprocated vertically and and in properly timed relation by a pair of vertical links 334, it being understood that the cross head is required to make an operative downward and a retractive upward movement in a comparatively short interval of time, so that there will be no interference with the continuous travel of the parcel next in order.

Referring to Figs. 23 and 24 it will be seen that on the constantly running shaft 296 there is keyed a cam 335 having a cam groove 336 accommodating a cam roller on the pin 337 fixed on the end of the arm 338. Said arm 338 is keyed on a rock shaft 339 on the outer ends of which are keyed arms 340, the outer ends of which are pivotally connected to the lower ends of the vertical links 334. As will be seen by close inspection of Fig. 24 the operative portion of the cam groove 326 is comparatively short thereby effecting the snappy down and up movement just referred to.

After the parcels have been separated by the punch mechanism they continue their travel and are delivered by the belts to any desired packing mechanism, or they may be packed by hand.

Inasmuch as in connection with the description of the details of the mechanism, I have described the operation of each mechanism, it is hardly necessary to restate the cycle of operations, it being understood that the various cams, shafts, gears, levers, etc. are so timed as to cause each operative part to be actuated in properly synchronized relation, so that there is no interference between the various mechanisms and each mechanism does its particular function at the proper time.

It will be understood that the details of construction and operation set forth herein are merely illustrative of a single application of my invention, the scope of which should be determined by reference to the appended claims, said claims being construed as broadly as possible consistent with the state of the art.

I claim as my invention:

1. In combination, means for supporting a strip of absorbent pad material, intermittent feed mechanism for said material, a compressing device, a saw, means for operating said compressing device and saw in unison intermediate the feeding movements of the feeding mechanism, and means for wrapping portions of the strip severed by the saw after the severing operation.

2. In combination means for supporting and feeding a strip of absorbent padding material, means for compacting localized portions of said strip adjacent to and on opposite sides of the line on which the strip is to be severed, means for severing the strip on said line while compacted, and means for subsequently wrapping the severed portions.

3. In combination, a rocking discharge chute, a rocking arm independent of said chute and provided with a seat for receiving material discharged by said chute, and a guard member movable relatively to said chute for retaining the material on said chute, but operative to permit discharge of said material when the chute has been rocked into position to deliver the material to said seat.

4. In combination, a swinging arm provided with a seat, and a rocking chute movable independently of said arm and for receiving material while in a horizontal position and discharging the material by gravity on to said seat when rocked into an inclined position.

5. In combination, a swinging arm provided with a seat, a rocking chute movable independently of said arm and for receiving material while in a horizontal position and discharging said material by gravity on to said seat when rocked into an inclined position, and a swinging guard member for preventing delivery of the material until the chute has been moved into delivery position.

6. In combination, an arm capable of being rocked on a horizontal axis, a support on the end of said arm for a section of strip of pad material, means for delivering said material onto said support, means for rocking said arm, a rotatable device for receiving the material delivered by the rocking of said arm, and means for engaging the section of pad material with a section of wrapping material as it is delivered to said rotatable device.

7. The improved step in the art of making absorbent pads, which consists in severing a length of enclosing material from the suspended end of a continuous strip, and simultaneously engaging said length with a section of absorbent pad material.

8. The improved step in the art of making absorbent pads, which consists in severing a length of enclosing material from a suspended end of a continuous strip, and simultaneously engaging said length with a section of absorbent pad material by moving said pad material substantially horizontally, thereby causing the upper margin of said length to bend partially around the pad.

9. The improved step in the art of making absorbent pads, which consists in severing a length of enclosing material from the suspended end of a continuous strip, simultaneously engaging said length with a section of absorbent pad material by moving said pad material substantially horizontally, thereby causing the upper margin of said length to bend partially around the pad, and subsequently folding the marginal portions of the upper and lower ends of said material over each other, thereby enclosing the pad.

10. The improved step in the art of making absorbent pads, which consists in severing a length of enclosing material from the suspended end of a continuous strip, simultaneously engaging said length with a section of absorbent pad material by moving said pad material substantially horizontally, thereby causing the upper margin of said length to bend partially around the pad, subsequently folding the marginal portions of the upper and lower ends of said material over each other, thereby enclosing the pad, causing the enclosed pad to travel in a direction at right angles to the lines of folding, and finally sewing together the folded ends while the article is so traveling.

11. In combination, means for engaging a pad of filler material with a sheet of enclosing material so that one of the end margins and the side margins of the sheet will extend beyond the pad, a former having substantially the same cross section as the pad, means for positioning said former to constitute in effect an extension of the pad and means for folding the side margins of the sheet in overlapping relation so as to enclose the pad and former.

12. In combination, means for engaging a pad of filling material with a sheet of enclosing material so that the end margins and the side margins of the sheet will extend beyond the pad, a pair of opposite formers having substantially the same cross section as the pad, means for positioning the said formers to constitute in effect opposite extensions of the pad and means for folding the said margins of the sheet in overlapping relation so as to enclose the pad and formers.

13. In combination, means for engaging a pad of filling material with a sheet of enclosing material so that the end margins and the side margins of the sheet will extend beyond the pad, a pair of formers having substantially the same cross section as the pad, means for moving the said formers in opposite directions towards said pad into position to constitute in effect pad extensions and means for folding the said margins of the sheet in overlapping relation so as to enclose the pad and formers.

14. In combination, a support, means for engaging a pad of filling material with a sheet of enclosing material and applying same to said support with the side margins of the sheet extending beyond the pad and the end margins of the sheet also extending beyond the pad, a pair of opposed formers mounted on opposite sides of said support, mechanism for moving said formers in opposed directions and towards said pad to constitute in effect extensions of said pad, and means for folding the side margins of the sheet over said pad and formers.

15. In combination, a support, means for engaging a pad of filling material with a sheet of enclosing material and applying same to said support with the side margins of the sheet extending beyond the pad and the end margins of the sheet also extending beyond the pad, a pair of opposed formers mounted on opposite sides of said support, mechanism for moving said formers in opposed directions and towards said pad to constitute in effect extensions of said pad, means for folding the side margins of the sheet over said pad and formers, and means for retracting said formers subsequent to the folding operation.

16. In combination, a support, means for engaging a pad of filling material with a sheet of enclosing material and applying same to said support with the side margins of the sheet extending beyond the pad and the end margins of the sheet also extending beyond the pad, a pair of opposed formers mounted on opposite sides of said support, mechanism for moving said formers in opposed directions and towards said pad to constitute in effect extensions of said pad, means for folding the side margins of the sheet over said pad and formers, means for withdrawing said formers subsequent to the folding operation, and means for moving said support to bring another portion thereof into association with said pad engaging means.

17. In combination, a rotary support provided with a plurality of pad receiving surfaces on its circumference, pad delivering mechanism for depositing a pad on one of said surfaces, means for intermittently rotating said support for bringing said surfaces successively into association with said pad applying means, folding mechanism for enclosing said pad in sheet material simultaneously applied to said supporting surface by said pad depositing means, and movable fillers cooperating with said folder mechanism and mounted on said support adjacent said pad receiving surfaces.

18. In combination, a rotary support provided with a plurality of pad receiving surfaces on its circumference, pad delivering mechanism for depositing a pad on one of said surfaces, means for intermittently rotating said support for bringing said surfaces successively into association with said pad applying means, folding mechanism for enclosing said pad in sheet material simultaneously applied to said supporting surface by said pad depositing means, movable filler plates cooperating with said folder mechanism and mounted on said support adjacent said pad receiving surfaces, and synchronized cams for successively operating said fillers.

19. In combination, a rotary support provided with a plurality of pad receiving surfaces on its circumference, pad delivering mechanism for depositing a pad on one of said surfaces, means for intermittently rotating said support for bringing said surfaces successively into association with said pad applying means, folding mechanism for enclosing said pad in sheet material simultaneously applied to said supporting surface by said pad depositing means, and movable fillers cooperating with said folder mechanism and mounted on said support adjacent said pad receiving surfaces, and synchronized opposite co-axial rotary cams for successively operating said fillers.

20. In combination, a rotary support provided with a plurality of pad receiving surfaces on its circumference, pad delivering mechanism for depositing a pad on one of said surfaces, means for intermittently rotating said support for bringing said surfaces successively into association with said pad applying means, folding mechanism for enclosing said pad in sheet material simultaneously applied to said supporting surface by said pad depositing means, movable fillers cooperating with said folder mechanism and mounted on said support adjacent said pad receiving surfaces, synchronized opposite co-axial rotary cams for successively operating said fillers and relatively stationary cam means operable to withdraw said filleds by rotation of said support.

21. In combination, means for severing the depending end of a sheet of flexible enclosing material and thereby allowing said end to fall freely, a movable member having means for holding a section of absorbent material, means for bringing said member into engagement with said severed end substantially simultaneously with the severing thereof, and means for receiving and folding the enclosing material around said section.

22. In combination, gauze-feeding mechanism, an elevated shear for severing the depending free end of a sheet of gauze so fed, a swinging arm having means for holding a pad of absorbent material, a receiving support, and means timed with the shear for operating said arm to engage the suspended end of gauze with the pad material for moving the gauze and pad into engagement with said receiving support.

23. In combination, a swing arm, a support on the end of said arm for a section of strip of pad material, means for delivering said material on to said support, means for swinging said arm, a rotatable device for receiving the material from said arm, means for engaging said section of pad material with a section of wrapping material as an incident to the delivery of said pad section to said rotatable device, the section of wrapping material being of greater width than the width of the section of pad material and positioned relatively thereto so as to extend outwardly from said pad section on opposite sides thereof, and means for folding the outwardly extending portions over the pad section.

GEORGE WEISS.